(12) United States Patent
Terry et al.

(10) Patent No.: US 12,082,115 B2
(45) Date of Patent: Sep. 3, 2024

(54) NR-U LBT MAC PROCEDURES

(71) Applicant: InterDigital Patent Holdings, Inc., Wilmington, DE (US)

(72) Inventors: Stephen E. Terry, Northport, NY (US); Adjakple M. Pascal, Great Neck, NY (US); Joseph M. Murray, Schwenksville, PA (US); Qing Li, Princeton Junction, NJ (US); Lakshmi R. Iyer, King of Prussia, PA (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 169 days.

(21) Appl. No.: 17/280,322

(22) PCT Filed: Sep. 26, 2019

(86) PCT No.: PCT/US2019/053135
§ 371 (c)(1),
(2) Date: Mar. 26, 2021

(87) PCT Pub. No.: WO2020/069114
PCT Pub. Date: Apr. 2, 2020

(65) Prior Publication Data
US 2022/0039016 A1    Feb. 3, 2022

Related U.S. Application Data

(60) Provisional application No. 62/736,816, filed on Sep. 26, 2018, provisional application No. 62/753,579, filed on Oct. 31, 2018.

(51) Int. Cl.
*H04W 52/02* (2009.01)
*H04W 4/06* (2009.01)
*H04W 72/23* (2023.01)

(52) U.S. Cl.
CPC ......... *H04W 52/0235* (2013.01); *H04W 4/06* (2013.01); *H04W 72/23* (2023.01)

(58) Field of Classification Search
None
See application file for complete search history.

(56) References Cited

U.S. PATENT DOCUMENTS

| 10,959,262 | B2* | 3/2021 | Yang ............... H04W 74/0808 |
| 2016/0212770 | A1 | 7/2016 | Lee et al. |
| 2016/0278048 | A1 | 9/2016 | Nory et al. |
| 2016/0323915 | A1* | 11/2016 | Liu ................. H04W 74/0825 |
| 2017/0006599 | A1 | 1/2017 | Dinan |
| 2017/0006640 | A1 | 1/2017 | Dinan |
| 2017/0027002 | A1 | 1/2017 | Yerramalli et al. |

(Continued)

FOREIGN PATENT DOCUMENTS

| CN | 102067704 A | 5/2011 |
| CN | 105580292 A | 5/2016 |

(Continued)

OTHER PUBLICATIONS

ZTE, "Impacts on MAC for NR-U operation", 3GPP TSG RAN WG2 NR #103 Meeting, R2-1811282, Aug. 2018, pp. 4.

(Continued)

*Primary Examiner* — Clemence S Han
(74) *Attorney, Agent, or Firm* — Flaster Greenberg, P.C.

(57) ABSTRACT

In NR-U, when LBT failures occur existing MAC procedures may take inappropriate actions resulting in unintended consequences. Methods, apparatuses, and systems associated with existing MAC procedures that help maintain proper operation and performance of MAC procedures when operating in unlicensed spectrum.

16 Claims, 14 Drawing Sheets

(56) References Cited

U.S. PATENT DOCUMENTS

| | | | |
|---|---|---|---|
| 2017/0118728 A1* | 4/2017 | Harada | H04W 72/23 |
| 2017/0142754 A1 | 5/2017 | Uziel et al. | |
| 2017/0265248 A1* | 9/2017 | Narasimha | H04L 5/0087 |
| 2017/0332358 A1* | 11/2017 | Park | H04L 1/1671 |
| 2017/0367120 A1 | 12/2017 | Murray et al. | |
| 2018/0124831 A1* | 5/2018 | Dinan | H04L 41/0654 |
| 2018/0176961 A1 | 6/2018 | Babaei et al. | |
| 2019/0223255 A1* | 7/2019 | Jeon | H04L 5/00 |
| 2019/0289544 A1 | 9/2019 | Yi et al. | |
| 2019/0387546 A1* | 12/2019 | Li | H04L 27/26132 |
| 2020/0077446 A1* | 3/2020 | Agiwal | H04W 16/14 |
| 2020/0351853 A1* | 11/2020 | Xiong | H04B 7/088 |
| 2021/0029734 A1* | 1/2021 | Liu | H04W 72/0446 |
| 2021/0168859 A1* | 6/2021 | Yang | H04W 76/11 |
| 2021/0243808 A1* | 8/2021 | Deenoo | H04W 74/0841 |

FOREIGN PATENT DOCUMENTS

| | | |
|---|---|---|
| CN | 107431597 A | 12/2017 |
| CN | 107926045 A | 4/2018 |
| CN | 108476532 A | 8/2018 |
| CN | 108521886 A | 9/2018 |
| EP | 3846573 A1 | 7/2021 |
| KR | 10-2017-0111643 A | 10/2017 |
| WO | 2017/136458 A2 | 8/2017 |
| WO | 2018/093939 A1 | 5/2018 |

OTHER PUBLICATIONS

ZTE: "Considerations on channel access procedure for NR-U", 3GPP Draft; R2-1811281 Considerations on Random Access Procedure for NR-U, 3rd Generation Partnership Project (3GPP), Mobile Competence Centre ; 650, Route Des Lucioles ; F-06921 Sophia-Antipolis Cedex ; France, vol. RAN WG2, No. Gothenburg, Sweden; Aug. 20, 2018-Aug. 24, 2018 Aug. 9, 2018, (Aug. 9, 2018), XP05152094.

Third Generation Partnership Project (3GPP), "Medium Access Control (MAC) protocol specification", Technical Specification Group Radio Access Network; Evolved Universal Terrestrial Radio Access (E-UTRA), Release 15, 3GPP TS 36.321 V15.2.0, Jul. 2018, 126 pages.

\* cited by examiner

NR-U LBT MAC PROCEDURES

CROSS-REFERENCE TO RELATED APPLICATIONS

This application is the National Stage Application of International Patent Application No. PCT/US2019/053135, filed Sep. 26, 2019 which claims the benefit of U.S. Provisional Patent Application No. 62/736,816, filed on Sep. 26, 2018, entitled "NR-U LBT MAC Procedures," and U.S. Provisional Patent Application No. 62/753,579, filed on Oct. 31, 2018, entitled "NR-U LBT MAC Procedures," the contents of both applications are hereby incorporated by reference herein.

BACKGROUND

LTE Licensed Assisted Access. 3GPP release 16 NR will support unlicensed operation without a licensed assisted connection which was available in previous releases. Since in previous releases there was always a licensed connection, it was not necessary to ensure a high level of QoS on the unlicensed connection.

Operation in unlicensed requires Listen Before Talk (LBT) procedures to not interfere with existing traffic and gain access to the channel.

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement in 3GPP TS 36.321, (E-UTRA), Medium Access Control (MAC) protocol specification, V15.2.0 [1]. Further context may be included in 3GPP TS 36.321, (E-UTRA), Medium Access Control (MAC) protocol specification, V15.2.0.

SUMMARY

Disclosed herein are methods, apparatuses, and systems associated with existing MAC procedures that may maintain proper operation and performance of MAC procedures, such as when operating in unlicensed spectrum. In NR-U when LBT failures occur existing MAC procedures may take inappropriate actions resulting in unintended consequences.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
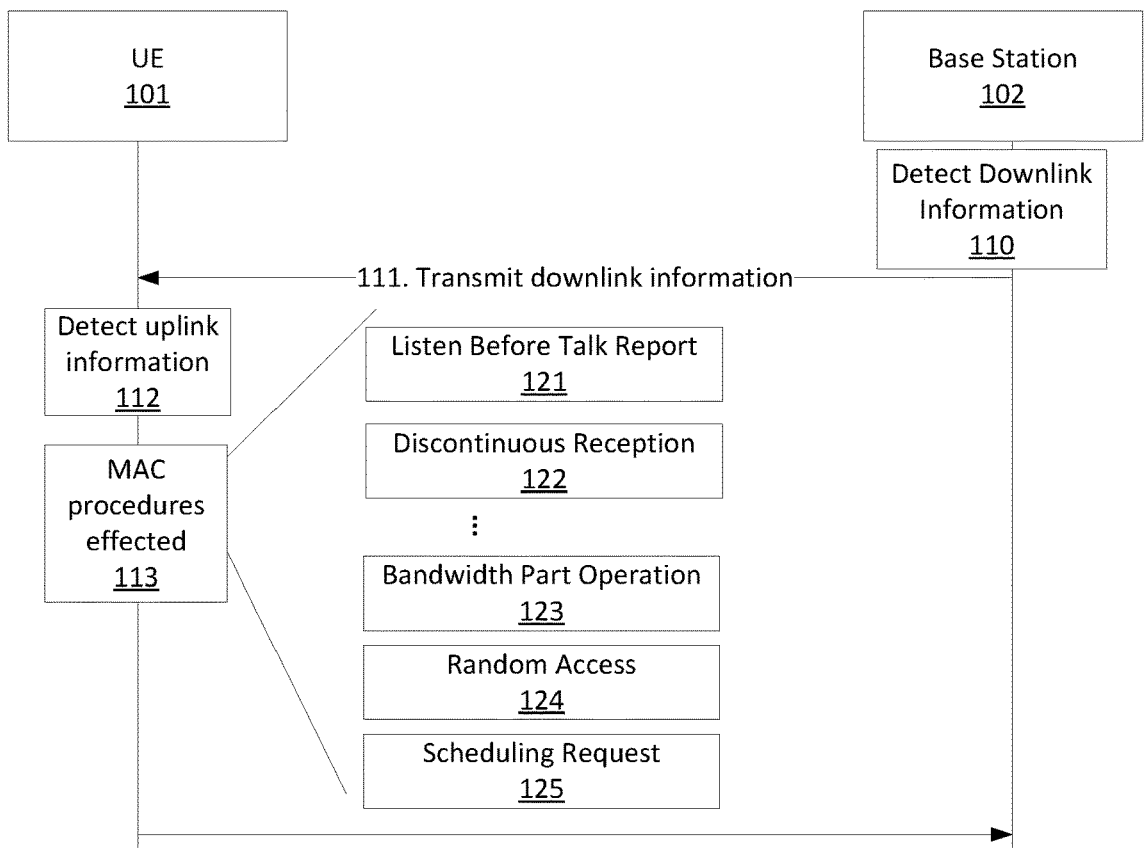
FIG. 1 illustrates an exemplary system for NR-U LBT MAC procedures.

Disclosed herein are methods, apparatuses, and systems associated with MAC procedures that help maintain proper operation and performance of MAC procedures, for example, when operating in unlicensed spectrum. In NR-U when LBT failures occur existing MAC procedures may take inappropriate actions resulting in unintended consequences.

Specific issues related to MAC procedures addressed herein may include issues associated with bandwidth part (BWP) operation procedure, random access procedure, Power Headroom Reporting (PHR) procedure, SCell activation or deactivation procedure, discontinuous reception procedure, scheduling request (SR) procedure, buffer status reporting procedure, logical channel prioritization procedure, or coordination of UE and node B (NB) MAC procedures, among other things.

The Bandwidth Part Operation Procedure Issue—When LBT Failures occur: The Bandwidth Part Inactivity Timer may expire resulting in switching to the Initial or Default BWP even when there is UL or DL data to be scheduled.

The Random Access Procedure Issue—When LBT failures occur: 1) The Random Access Response Window may expire without allowing a sufficient number (e.g., threshold number) of transmission opportunities for the Random Access Response; 2) The Preamble Transmission Counter may reach the maximum number of transmissions without allowing for a sufficient number preamble transmissions needed for successful preamble transmission; 3) The Contention Resolution Timer may expire without allowing for a sufficient number of PDCCH transmission opportunities in response to MSG3 transmission; or 4) The power ramping may be increased even when there is no preamble transmission resulting in incorrect power setting.

The Power Headroom Reporting (PHR) Procedure Issue—When LBT failures occur: 1) The NB may not be able to determine when the PHR was calculated, and what was transmitted at that time, resulting in an incorrect power headroom determination; 2) PHR triggering due to the PHR Periodic Timer, reconfiguration, SCell Activation, PSCell Addition, or Prohibit Timer expiration may occur inappropriately early; 3) PHR Calculation may incorrectly calculate power headroom assuming a real transmission; or 4) The PHR Prohibit timer may be set even when there was no PHR transmission.

The SCell Activation/Deactivation Procedure Issue—When LBT failure occur: The SCell Deactivation Timer may expire, deactivating the SCell when there is UL or DL data to be scheduled on the SCell.

The Discontinuous Reception Procedure Issue—When LBT failures occur: The On Duration or Inactivity Timers may expire, stopping PDCCH reception, when there is UL or DL data to be scheduled.

The Scheduling Request Procedure Issue—When LBT failures occur: 1) Failed SR transmissions will not initiate a Random Access procedure; 2) The SR Prohibit timer may be set even when there was no SR transmission; 3) The SR Transmission Counter may reach the maximum number of transmissions without allowing for a sufficient number SR transmissions needed for successful SR transmission; or 4) SR Pending may be cleared even when there is no SR transmission.

The Buffer Status Reporting Procedure Issue—When LBT failures occur: When there may be UL-SCH resources available, BSR may not be transmitted and an SR will not be triggered.

The Logical Channel Prioritization Procedure Issue—When LBT failures occur: A MAC PDU may not be able to be transmitted in a subsequent grant resulting in loss of user data and control signaling.

Coordination of UE and NB MAC Procedures Issue—When LBT failures occur: The UE may take actions effecting MAC procedures that need to be known to the NB for proper operation. Additionally, the NB may take actions independent of UE behavior.

In view of the aforementioned example issues, there may be modification of existing MAC procedures ore the creation of new MAC procedures that may take into account LBT failures so that inappropriate actions are not taken and unintended consequences are avoided. A summary of how the issues may be addressed are disclosed below.

FIG. 1 illustrates an exemplary system for NR-U LBT MAC procedures. At step 111, UE 101 may obtain information regarding base station 102 channel access to the UE 101. The information may be downlink information signaled from base station 102. At step 112, UE 101 may detect information about uplink channel access (e.g., uplink information) to the base station 102. The uplink information may be detected by doing Listen-Before-Talk (LBT) operation or another operation (e.g., operations within 3GPP TS 36.213 V14.8.0 section 15). At step 113, based on the information of step 111 or step 112 (e.g., uplink/downlink information), MAC procedure operation may be effected. MAC procedures may include LBTR 121 (e.g., FIG. 10), DRX 122 (e.g., FIG. 6), BWP operation 123 (e.g., FIG. 2), or random access 124 (e.g., FIG. 3), Scheduling Request 125 (e.g., FIG. 7) among others as disclosed herein (e.g., PHR, BSR, or BFD). It is contemplated herein that uplink or downlink channel access information may be used in the steps above.

FIG. 2-FIG. 10 illustrate exemplary methods associated with NR-U LBT MAC procedures, which are described in more detail herein.

Figure 2:
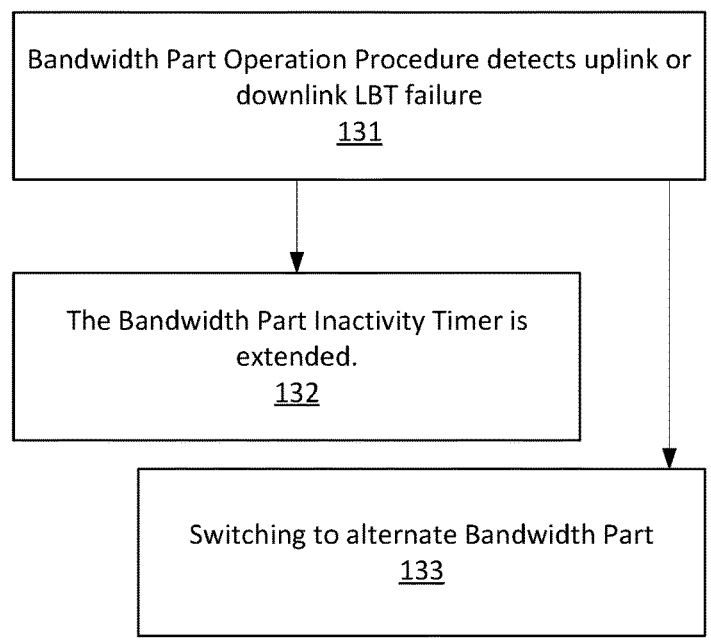
FIG. 2 illustrates an exemplary method associated with NR-U LBT MAC procedures.

FIG. 2 illustrates an exemplary method for a bandwidth part (BWP) operation procedure. For example, at step 131, one or more LBT failures (e.g., a threshold number of uplink/downlink LBT failures) are detected. At step 132, based on the detected failure of step 131, a BWP inactivity timer may be extended. The inactivity timer may be extended so that switching to the initial or default BWP may be avoided because there may be UL or DL data to be scheduled. At step 133, based on the detected failure of step 131, switching to alternate Bandwidth Part.

Figure 3:
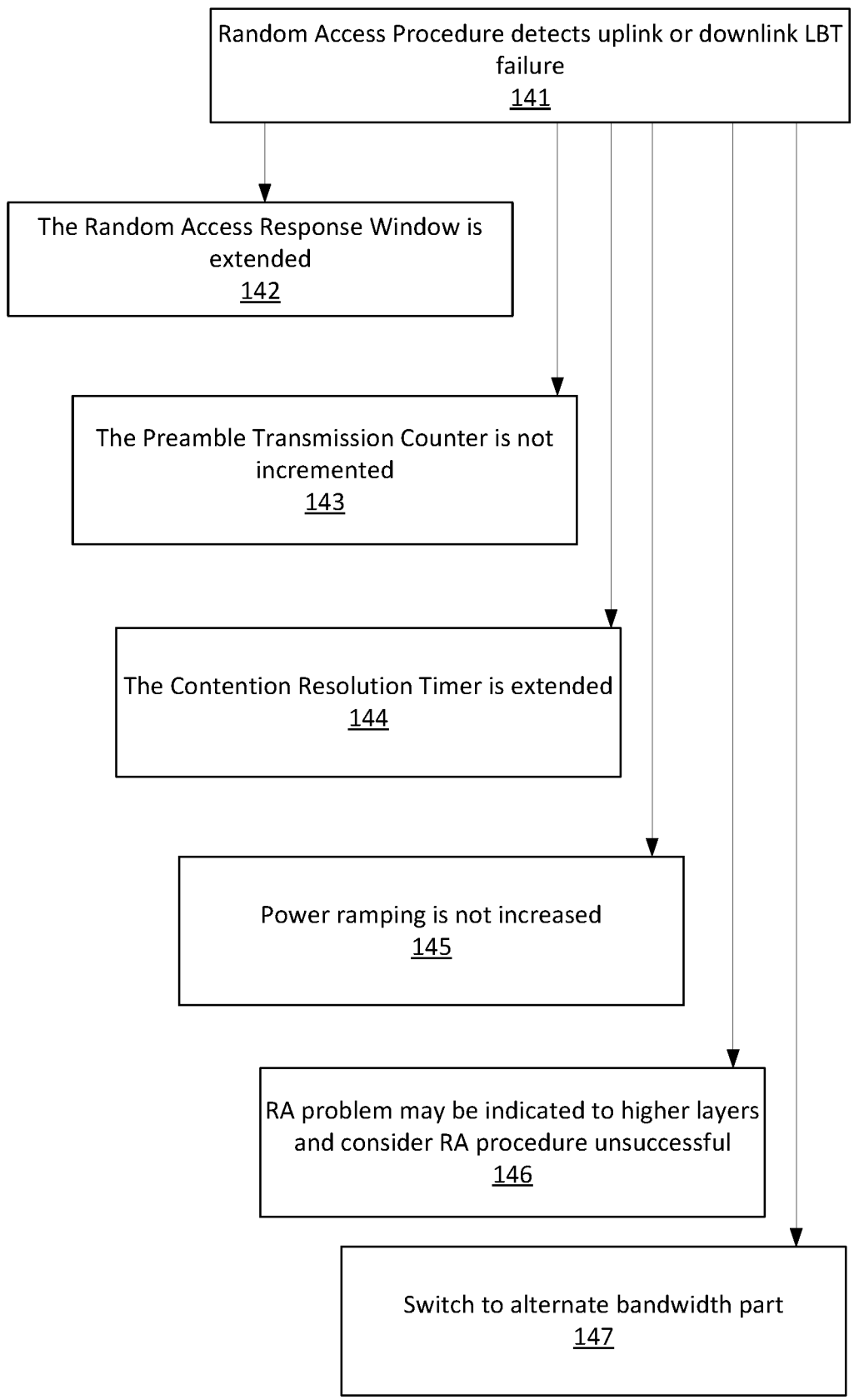
FIG. 3 illustrates an exemplary method associated with NR-U LBT MAC procedures.

FIG. 3 illustrates an exemplary method for a random access procedure. For example, at step 141, one or more LBT failures (e.g., a threshold number of uplink/downlink LBT failures) are detected. Based on the detected failure of step 141, UE 101 may execute steps 142, 143, 144, or 145. At step 142, the random access response window may be extended. Step 142 may allow for a sufficient number of transmission opportunities for the random access response. At step 143, the preamble transmission counter may not be incremented. Step 143 may allow for a sufficient number of preamble transmissions to be made to allow for successful preamble transmission. At step 144, the contention resolution timer may be extended, which may allow for a sufficient number of PDCCH transmission opportunities in response to MSG3 transmission. At step 145, the power ramping may not be increased, which may assist in maintaining proper power setting. At step 146, RA problem may be indicated to higher layers and consider RA procedure unsuccessful. At step 147, there may be a switch to alternate bandwidth part. It is contemplated herein that one or more of step 142 through step 147 may occur based on step 141.

Figure 4:
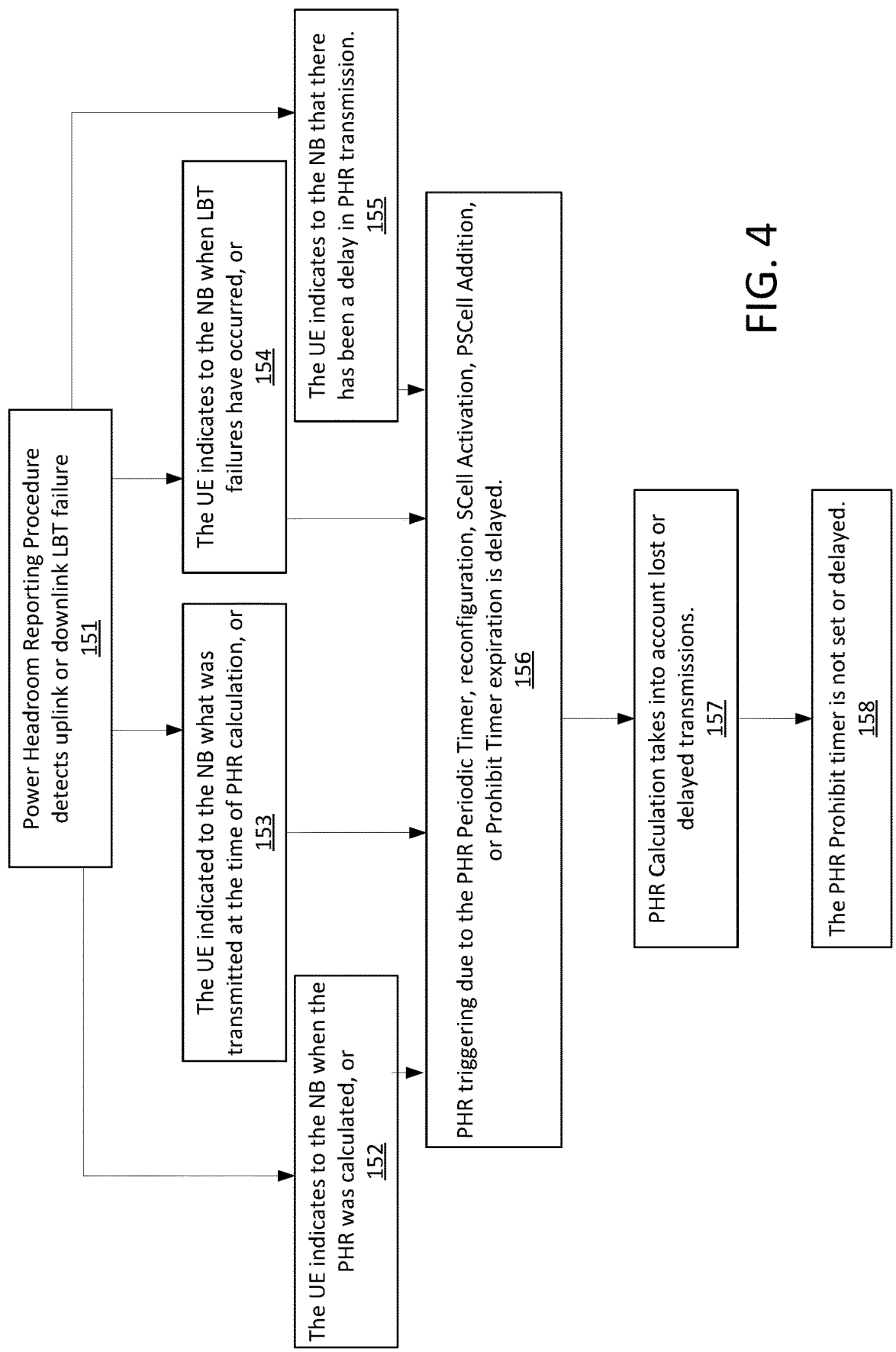
FIG. 4 illustrates an exemplary method associated with NR-U LBT MAC procedures.

FIG. 4 illustrates an exemplary method for a power headroom reporting procedure. For example, at step 151, one or more LBT failures (e.g., a threshold number of uplink/downlink LBT failures) are detected. Based on the detected failure of step 151, UE 101 may execute steps 152, 153, 154, 155, 156, 157, or 158. At step 152, UE 101 may indicate to base station 102 (e.g., node B) when the PHR was calculated. At step 153, UE 101 may indicate to base station 102 what was transmitted at the time of PHR calculation. At step 154, UE 101 may indicate to base station 102 when LBT failures have occurred. At step 155, UE 101 may indicate to base station 102 that there has been a delay in PHR transmission. At step 156, PHR triggering due to the PHR Periodic Timer, reconfiguration, SCell Activation, PSCell Addition, or Prohibit Timer expiration may be delayed. At step 157, PHR Calculation may take into account lost or delayed transmissions. At step 158, PHR prohibit timer may be not set or may be delayed.

Figure 5:
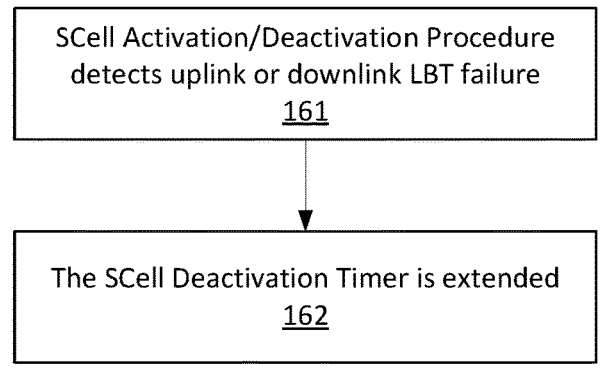
FIG. 5 illustrates an exemplary method associated with NR-U LBT MAC procedures.

FIG. 5 illustrates an exemplary method for a SCell Activation/Deactivation Procedure. For example, at step 161, one or more LBT failures (e.g., a threshold number of uplink/downlink LBT failures) are detected. Based on step 161, at step 162, the SCell deactivation timer may be extended, which may allow for additional UL or DL data scheduling opportunities on the SCell.

Figure 6:
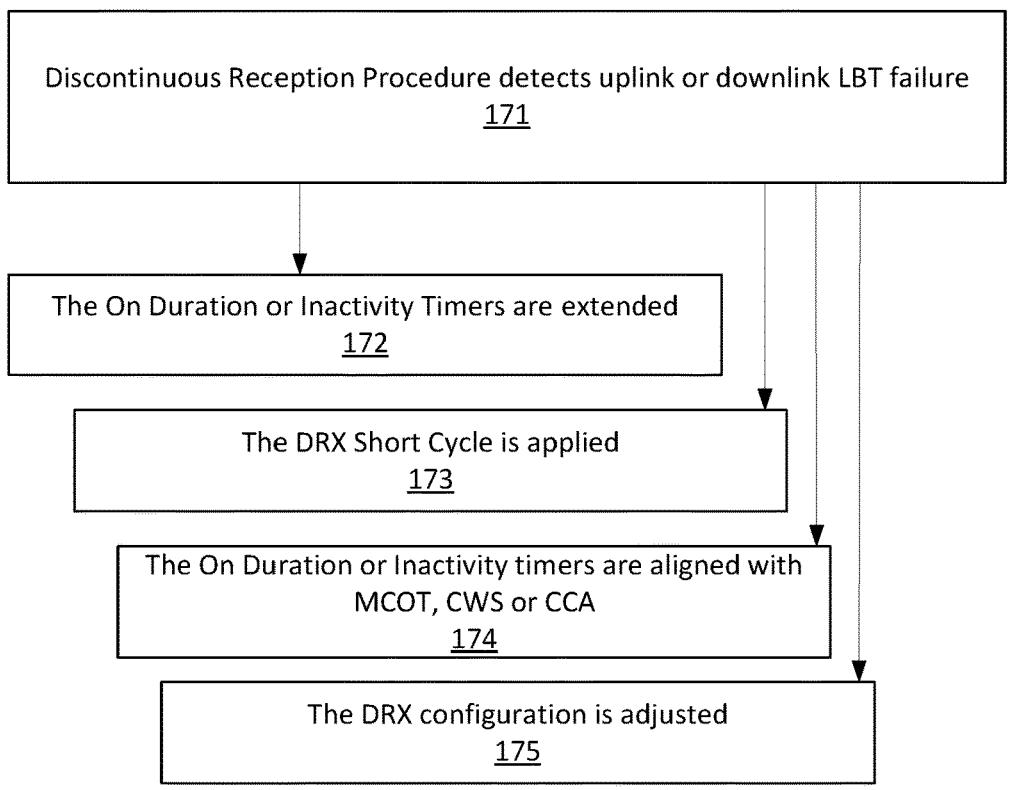
FIG. 6 illustrates an exemplary method associated with NR-U LBT MAC procedures.

FIG. 6 illustrates an exemplary method for a discontinuous reception procedure. For example, at step 171, one or more LBT failures (e.g., a threshold number of uplink/downlink LBT failures) are detected. Based on step 171, the On Duration or Inactivity Timers may be extended, which may allow for additional UL or DL data scheduling opportunities. At step 173, DRX Short Cycle timer may be applied. At step 174, On Duration or Inactivity timers may be aligned with MCOT, CWS or CCA. At step 175, DRX configuration may be adjusted. It is contemplated herein that one or more of step 172 through step 175 may occur based on step 171.

Figure 7:
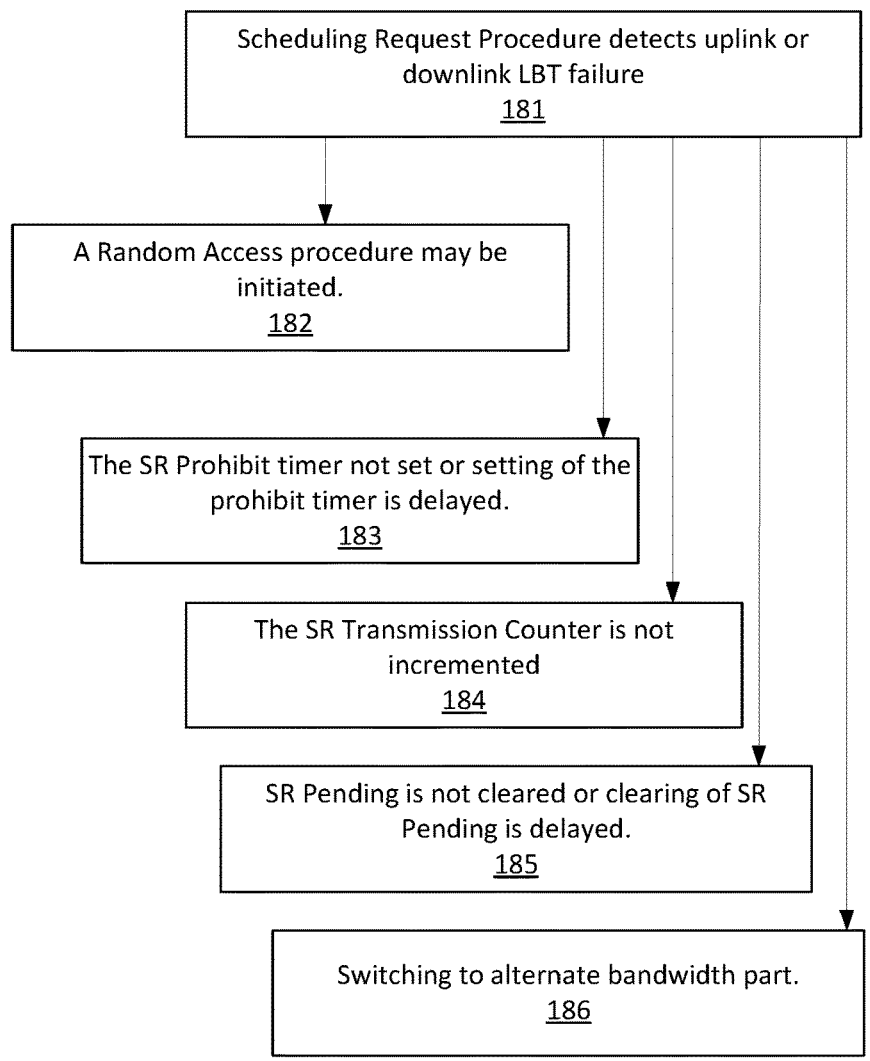
FIG. 7 illustrates an exemplary method associated with NR-U LBT MAC procedures.

FIG. 7 illustrates an exemplary method for a scheduling request procedure. For example, at step 181, one or more LBT failures (e.g., a threshold number of uplink/downlink LBT failures) are detected. Based on the detected failure of step 181, UE 101 may execute steps 182, 183, 184, or 185. At step 182, a random access procedure may be initiated. At step 183, the SR prohibit timer may not be set or the setting of the prohibit timer may be delayed. At step 184, the SR transmission counter may not be incremented to allow for a sufficient number of SR transmissions needed for successful SR transmission. At step 185, SR pending may not be cleared or the clearing of SR Pending may be delayed. At step 186, there may be a switching to an alternate bandwidth part. It is contemplated herein that one or more of step 182 through step 186 may occur based on step 181.

Figure 8:
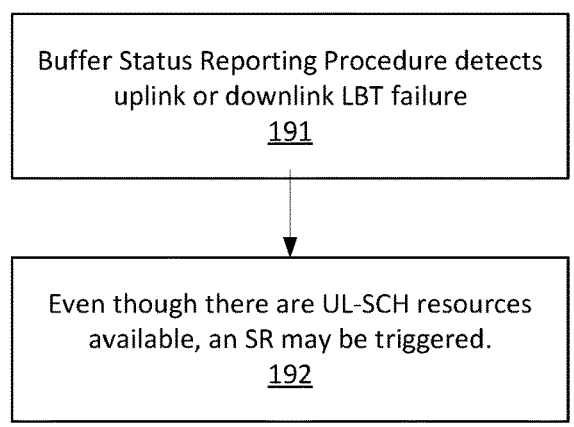
FIG. 8 illustrates an exemplary method associated with NR-U LBT MAC procedures.

FIG. 8 illustrates an exemplary method for a buffer status reporting procedure. For example, at step 191, one or more LBT failures (e.g., a threshold number of uplink/downlink LBT failures) are detected. Based on step 192, even though there may be UL-SCH resources available, an SR may be triggered.

Figure 9:
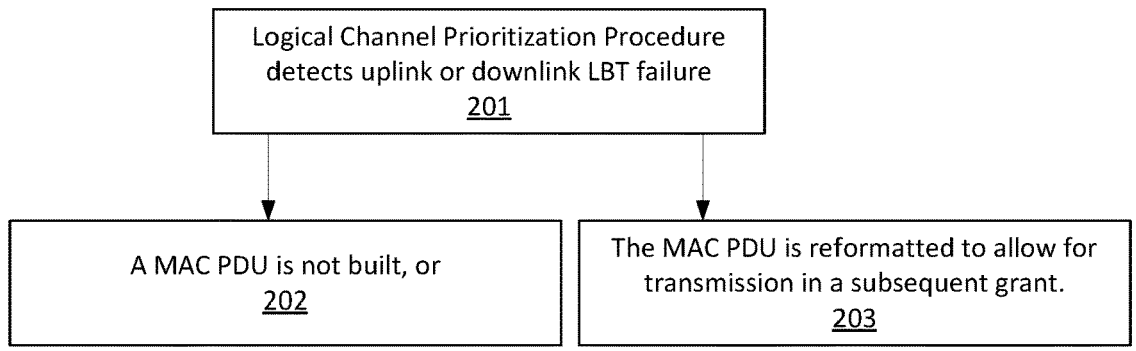
FIG. 9 illustrates an exemplary method associated with NR-U LBT MAC procedures.

FIG. 9 illustrates an exemplary method for a logical channel prioritization procedure. For example, at step 201, one or more LBT failures (e.g., a threshold number of uplink/downlink LBT failures) are detected. Based on the detected failure of step 201, UE 101 may execute steps 202 or 203. At step 202, a MAC PDU may not be built. At step 203, a MAC PDU may be reformatted, which may allow for transmission in a subsequent grant.

Figure 10:
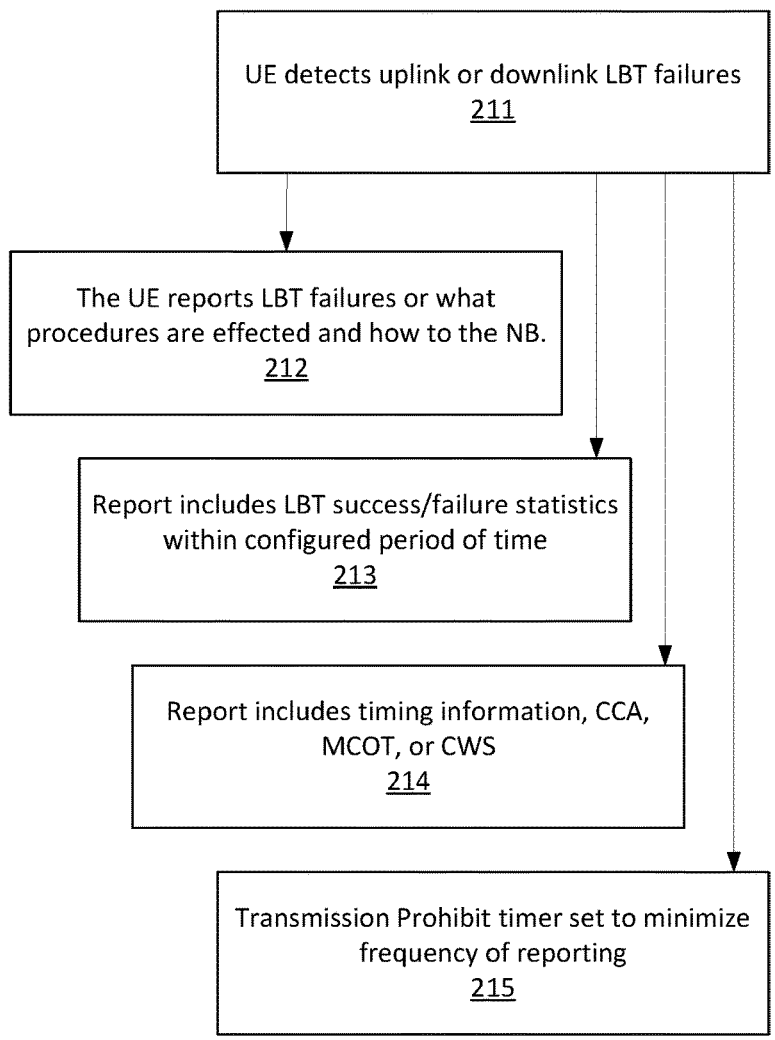
FIG. 10 illustrates an exemplary method associated with NR-U LBT MAC procedures.

FIG. 10 illustrates an exemplary method for UE 101 reporting LBT failure or success information to the base station 102, which may allow improved coordination of UE 101 and base station MAC Procedures. For example, at step 211, one or more LBT failures (e.g., a threshold number of uplink/downlink LBT failures) are detected. Based on step 211, UE 101 may report LBT failures or report which procedures are affected and how. At step 213, Report includes LBT success/failure statistics within configured period of time. At step 214, Report includes timing information, CCA, MCOT, or CWS. At step 215, Transmission Prohibit timer set to minimize frequency of reporting. It is contemplated herein that one or more of step 212 through step 215 may occur based on step 181.

FIG. 2-FIG. 10 illustrate exemplary methods associated with NR-U LBT MAC procedures. Multiple NR-U LBT MAC procedures are described in more detail below.

NR-U LBT Operation Effect on MAC

The disclosed subject matter may apply to the overall MAC operation and numerous specific MAC procedures. These MAC procedures may include bandwidth part (BWP) operation, random access (RA), power headroom reporting (PHR), Scell activation and deactivation, logical channel prioritization (LCP), discontinuous reception (DRX), scheduling request (SR), buffer status report (BSR), and potentially a new LBT MAC procedure and others.

LBT Failures can result in unnecessary and unintended effects on these MAC procedures. With knowledge of LBT Failures or successes these MAC procedures may operate similarly and with similar performance to operation in licensed spectrum where LBT is not required. It is contemplated that the steps (e.g., actions) that may be disclosed with a first MAC procedure (e.g., Random Access) may be applicable to a second MAC procedure (e.g., BWP Operation). Therefore, the steps are generally not limited to a particular MAC procedure.

General Considerations for Both UL and DL LBT Failures

With respect to the effect on MAC procedures LBT failures may be considered in the UL or in the DL. Depending on the MAC procedure, and specific actions within the procedure, both UL and DL LBT failures may be considered, or only UL or only DL LBT failures may be considered. Additionally, how LBT indications are provided to the MAC and what information is provided may be different for the UL and DL.

For UL LBT operation the PHY layer may indicate to the MAC, LBT success or failure. The UL LBT success or failure indication may be associated with an UL transmission or the UL LBT procedure may be performed independently of an UL transmission. Each UL LBT success or failure indication may be associated with one or more MAC procedures.

For DL LBT operation the NB may signal to the UE DL LBT success or failures. The DL LBT success or failure indication may be associated with an DL transmission or the DL LBT procedure may be performed independently of an DL transmission. Each DL LBT success or failure indication may be associated with one or more MAC procedures.

Depending on the MAC procedure, and specific actions within the procedure it may be necessary to perform LBT even when there is no associated transmission. This may be necessary since currently MAC procedures assume there is constant access to the channel and there is no halting or blocking of transmissions. For example, if the UE detects no downlink assignments or uplink grants MAC procedures there may be an assumption that there is no data to be scheduled for transmission in the downlink or uplink. But there may be data to be scheduled for transmission which has been blocked or delayed by LBT failures. In this case MAC procedures may take actions which may result in unintended or unwanted consequences.

When LBT Failure or Success may be referred to in this disclosure for overall MAC operation or specific MAC procedures, both uplink LBT or downlink LBT may be considered. Depending on the MAC procedure, and specific actions within the procedure, both UL and DL LBT failures are considered, or just UL or just DL LBT failures are considered.

It should be noted it is not necessary to signal or indicate to the MAC both LBT Failures and Successes. Lack of am LBT Failure indication may be interpreted as a Success, and lack of a Success indication may be interpreted as a Failure. UL LBT indications from the PHY layer may only indicate LBT Failures, and DL LBT indications from the NB may only indicate LBT Successes.

LBT success or failure indication may be provided periodically on known occasions or may be triggered by specific actions taken by a MAC procedure. DL LBT successes or failures may be periodically signaled by the NB, and UL LBT successes or failures may be indicated by the PHY layer depending on operation of specific MAC procedures. Note periodic indications may be augmented by on demand indications driven by MAC procedures and vice versa.

LBT success or failure indications may be for a specific LBT procedure operation or the indications may provide information on more than one LBT procedure operation over a known period of time. The period of time may be the period since the last report. UL LBT indications may result from a specific LBT procedure operation, and DL LBT indications may provide information on multiple (e.g., a threshold number of) LBT operations over a period of time.

LBT success or failure indications may provide information on the carrier and BWP(s), where the LBT is performed. In addition to uplink or downlink LBT success, failure, indications further LBT procedure information may be provided to MAC procedures. MAC procedures take into account transmission opportunities in the downlink and uplink. For proper operation of these MAC procedures it may be necessary to know the time periods transmissions can or can't be made in the uplink and downlink. To accomplish this, it is disclosed herein an addition to, or included with the LBT success or failure indication, the period of Clear Channel Assessment (CCA), the selected Maximum Channel Occupancy Time (MCOT), the selected Contention Window Size (CWS), and other timing information is provided to the MAC to allow for proper determination of downlink and uplink transmission opportunities. The MCOT, CWS, or other timing may be identified by the Channel Access Priority Class (CAPC) or another index representing the selected timing.

Downlink LBT Success/Failure Indications

It has been discussed that a DL LBT Success indication may be signaled from the NB to the UEs during the UEs' DRX On Duration to effect DRX cycles. This should be extended to include the period the DRX Inactivity Timer is running, and potentially all periods that comprise DRX Active Time. For example, when a Random Access or Scheduling Request procedure is initiated while the UE is not within the DRX On Duration, knowledge of LBT failures may be necessary for proper operation and performance similar to operation when LBT is not required.

Further, as a more comprehensive way to address this problem consider DL LBT Success indications that are continuously transmitted in a periodic manner known to the UE to allow MAC procedures which run outside of the DRX Active Time to benefit from the knowledge of DL LBT Success and Failures.

The DL LBT Success indication may be a new explicit signal or implicitly detected. For example, DL LBT Success may be implicitly detected by reception of SSB or DRS, and the new explicit signal may be a new DCI format (e.g., addressed to individual UE or a group of UEs or broadcast to all UEs).

Signaling DL LBT Success indications continuously in a periodic manner does not necessarily add complexity or require greater use of resources because DRX On Durations are in general staggered in time for different UE's. Depending on the periodicity signaling overhead may even be reduced.

It should also be noted that signaling DL LBT indications may be UE specific or specific to groups of UE's that share DRX On Durations. Cell specific DL LBT indications can result in a more efficient use of resources and more consistent MAC procedure operation and performance.

It is also considered the LBT Success indication may not be a single indication. The information signaled may also provide information for the period since the last LBT Success indication. The information signaled may also provide information for how long the NB has access of the DL channel, for example, to a specific channel or BWP. In this case, MAC procedures may have continuous knowledge over time of DL LBT Success or Failure which may result in more accurate effect on MAC procedures due to DL LBT Failure.

Downlink success indications may also provide timing information identifying periods when transmissions can and cannot be made in order for MAC procedures to be able to determine transmission opportunities accurately. To accomplish this, there may be an addition to, or included with the LBT success indication, the period of Clear Channel Assessment (CCA), the selected Maximum Channel Occupancy Time (MCOT), the selected Contention Window Size (CWS), or other timing information provided to the MAC to allow for proper determination of downlink transmission opportunities. The MCOT, CWS, or other timing information may be identified by the Channel Access Priority Class (CAPC) or another index representing the selected timing.

Uplink LBT Success/Failure Indications

In addition to the NB indicating LBT Failure or Success status to the UE, the UE may provide UL LBT Failure or Success information to the NB.

As disclosed herein, there may be multiple potential effects on UE MAC procedures. There may be multiple cases where it may be necessary for the NB to know how LBT Failure or Success have affected certain MAC procedures. For example, if DRX Active Time or DRX Cycles have been affected the NB must know for the UE to be properly scheduled.

The LBT procedure may do more than indicate UL LBT failures to the NB. After a significant amount of UL LBT failures, other actions may be taken. As discussed herein, operation of existing MAC procedures may be affected by LBT failures. The new LBT procedure has the possibility to take new actions to help resolve LBT failures. For example, the channel Access Priority may be adjusted to increase the chance of successful LBT.

Total number of LBT failures may be counted, which may be within a specified or configured period of time. Alternatively, LBT Failure Counters (FC) may count consecutive LBT failures, and upon an LBT success the LBT FC may be reset to zero. The period in which LBT failures may be counted may be a sliding window in time. When the LBT failure counter exceeds a specified or configured threshold, the LBT State may be considered failed. If a specified or configured number of LBT failures have not been exceeded or a specified or configured number of LBT success indications are received, the LBT State may be considered successful. MAC procedures may check the LBT State rather than counting individual LBT failures associated with the MAC procedure. MAC procedures may adjust counters and timers according to the LBT State. For example, MAC procedures may extend counters and timers, or consider timers and counters to have reached the maximum thresholds depending on the LBT State. The LBT State may also be indicated to higher layers. For example, to affect RRC procedures.

A new MAC LBT Report (LBTR) procedure may be defined to provide UL LBT success or failure information. A LBTR MAC CE may provide historical information on previous UL LBT results. This may be over a certain period relative to when the report was generated. For example, it may be the period since the last LBTR MAC CE was transmitted. The MAC CE may provide information relative to which MAC procedure(s) was affected or when the LBT failure occurred so that the NB may attempt correlate which procedure(s) were affected. The LBTR MAC CE may also include BWP information in the LBT results for e.g., on which BWP LBT fails and on which BWP LBT was successful. RRC may configure into the UE, the LBTR reporting period.

Alternatively, UL physical control signaling may provide UL LBT Failure or Success indication. This may be carried on PUCCH or piggybacked on PUSCH if scheduled or new UL signaling. Lack of reception of an periodic UL signaling may be interpreted as UE LBT Failure. This may be the PUCCH or new UL signaling. New UL signaling may have to be configured so that NB reception occurs at a known physical resource and at a known time.

Uplink LBT success or failure indications may also provide timing information identifying periods when transmissions can and cannot be made in order for MAC procedures to be able to able to determine transmission opportunities accurately. To accomplish this, it is proposed in addition to, or included with the LBT success or failure indication, the period of Clear Channel Assessment (CCA), the selected Maximum Channel Occupancy Time (MCOT), the selected Contention Window Size (CWS), or other timing information is provided to the MAC to allow for proper determination of uplink transmission opportunities. The MCOT, CWS, or other timings may be identified by the Channel Access Priority Class (CAPC) or another index representing the selected timing.

LBT Effect on MAC Timers and Counters

LBT failures may result in lost transmission opportunities. Loss of transmission opportunities also result in a greater period of time to achieve successful transmissions. MAC procedures consider an amount of transmission opportunities and period of time to complete before declaring failure of the procedure. To properly perform MAC procedures when LBT is required, the count of transmission opportunities and possibly the period allowed for the procedure to complete successfully need to consider LBT failures.

Existing MAC procedures assume when a MAC PDU is given to the PHY layer or an instruction is given to the PHY to transmit PHY uplink control information (e.g. SR), the PDU or the PHY uplink control information is transmitted. When a MAC CE associated with a particular MAC procedure is built and multiplexed into a MAC PDU it may be assumed this MAC CE is transmitted. To limit the frequency a MAC CE or PHY uplink control information associated with particular MAC procedures may be transmitted, prohibit timer may be set when the MAC CE is built and the MAC PDU may be given to the PHY layer, or when instruction is given to the PHY to transmit PHY uplink control information. To properly control the frequency a MAC CE or PHY uplink control information may be transmitted and ensure it is transmitted when needed setting of these prohibit timers also may consider LBT failures.

The sequence of processing MAC procedures also may be considered. Existing procedures may increment counters and timers may run when the MAC procedure executes before LBT is performed by the PHY layer. Multiple methods may be considered with regard to affecting the existing MAC procedures, which may be related to the following: 1) When the MAC receives an indication of LBT failure from the PHY layer counters and timers are adjusted to take the transmission failure into account; 2) When LBT succeeds timers and counters are acted upon; or 3) LBT failure are recorded during the period between when the initial MAC procedure was performed or between when they were initially set to the point counter(s) or timer(s) reach their maximum threshold.

When the MAC receives an indication of LBT failure from the PHY layer counters and timers are adjusted to take the transmission failure into account. Counters that were incremented when the MAC procedure was performed may be decremented so that they are unchanged from what they were set to before the procedure was performed. This may be somewhat more complex for the timers. Optimally the maximum time for the procedure should not consider the period of LBT failure. There are multiple options for effecting MAC timers when LBT failures occur depending on how the timers are used for different MAC procedures: a). The period from when the MAC procedure associated with the LBT failure was performed to the next opportunity to perform the MAC procedure is subtracted from the timers or is added to the maximum time threshold (when the timer expires); b). The timer is stopped upon reception of the LBT failure indication and restarted upon the next opportunity to perform the MAC procedure; c). The timer is restarted upon the LBT failure indication; or d). The period from when the timer in the MAC procedure associated with the LBT failure was set (start or restart) to the next opportunity to set the timer in the MAC procedure is subtracted from the timers or is added to the maximum time threshold (when the timer expires).

One concern with this approach is what happens when between the time when the MAC procedure was performed and reception of an LBT failure indication counter(s) or timer(s) associated with the MAC procedure reaches the maximum value. One way to address this issue would be when a timer or counter reaches its maximum value the MAC checks if it is awaiting an LBT indication for the previous transmission and only invokes the actions associated with the timer or counter expiration after a successful LBT indication is determined.

When LBT succeeds timers and counters are acted upon. In this method, when the MAC procedure is performed counter(s) and timers(s) are not acted on. Upon indication of LBT success, the counters are incremented and timers are checked or adjusted. One issue with this approach is if upon the LBT success indication the timers or counters have reached their maximum threshold, which in cases mean the MAC procedure would have been performed differently. There are a few options to deal with this situation: When performing the MAC procedure timers and counters may be checked to see if upon performing the procedure the timers or counters would have reached their maximum thresholds if they had been adjusted according to the procedure, and in this case the MAC procedure may take actions as if the counters or timers had reached their maximum thresholds.

LBT failures may be recorded during the period between when the initial MAC procedure was performed or between when they were initially set to the point counter(s) or timers(s) reach their maximum threshold. When timers or counters reach their maximum threshold the LBT failure record is checked, and if LBT failures have occurred the procedures adjust the timers and counters to take the LBT failures into account. There may b multiple options to accomplish this as the following (a) or (b): (a) The maximum timer and counter thresholds are adjusted according to the number of LBT failures or the time period of LBT failures so that actions taken upon reaching maximum thresholds are not taken at this time; or (b) The timers and counters are restarted according to the number of failures and the time period of the LBT failures so that actions taken upon reaching maximum thresholds are not taken at this time.

LBT failures affecting timers and counters may result in an unacceptable delay (e.g., reaching a threshold) or even endlessly stalling of a MAC procedure. MAC procedure counters and timers may never reach their maximum thresholds. The disclosed changes to the MAC procedures therefore may take into account the possibility of continuous or a significant amount of LBT failures. In this case, the MAC procedures may take into account a maximum extension in time or maximum extension of counters so each MAC procedure is properly performed. For example, limiting extensions in MAC procedure counters (MAC PC) and timers (MAC PT) may be addressed by the following methods: 1) MAC procedure LBT Failure Counters (LBT FC); MAC PC and MAC PT Extension Counters (EC); or MAC PC and MAC PT Extended Maximum Thresholds (EMT).

MAC procedure LBT Failure Counters (LBT FC): LBT FC's may count total LBT failures, which may be within a specified or configured period of time. Alternatively, LBT FC's may count consecutive LBT failures, and upon an LBT success the LBT FC is reset to zero. LBT FC periods may be the time allowed for a MAC procedure to complete, or may be sliding windows in time. A specific MAC procedure may have more than one LBT FC. When a MAC procedure performs independent actions in parallel each may have an LBT FC. LBT FC's may have specified or configured maximums. When an LBT FC reaches a maximum count, the MAC PC or MAC PT are no longer extended upon LBT failure for the MAC procedure. Alternatively, when an LBT FC reaches a maximum count the MAC procedure takes actions as if the MAC PC or MAC PT have reached their maximum values. In cases this results in the MAC procedure to be considered to have failed.

MAC PC and MAC PT Extension Counters (EC): LBT failures cause MAC PC or MAC PT maximum thresholds to be extended. The criteria for extending maybe a specified or configured number of LBT failures within a specified or configured period of time. For example, it may be the MAC PT maximum threshold. EC's may count total MAC PC or MAC PT extensions, which may be within a specified or configured period of time. Alternatively, EC's may count consecutive MAC PC or MAC PT extensions. EC periods may be the time allowed for a MAC procedure to complete, or may be sliding windows in time. A specific MAC procedure may have more than one EC. When a MAC procedure performs independent actions in parallel each may have an EC. EC's may have specified or configured maximums. When and EC reaches a maximum count the MAC PC or MAC PT are no longer extended upon LBT failure for the MAC procedure. Alternatively, when an EC reaches a maximum count the MAC procedure may take actions as if MAC PC's or MAC PT's have reached their maximum values. This may result in the MAC procedure to be considered to have failed.

MAC PC and MAC PT Extended Maximum Thresholds (EMT): LBT failures may cause MAC PC or MAC PT maximum thresholds to be extended. The MAC PC or MAC PT maximum thresholds may be extended upon each LBT failure or upon a specified or configured number of LBT failures within a specified or configured period of time. For example, the period of time may be the current MAC PT maximum threshold. The MAC PC or MAC PT maximum thresholds may be extended upon a specified or configured consecutive number of LBT failures. When MAC PC or MAC PT reach a specified or configured EMT, the MAC PC or MAC PT maximum thresholds may no longer be extended. In cases this results in the MAC procedure to be considered to have failed.

MAC procedures may also have timers that may be used to control the frequency the procedure is performed. These timers may be known as prohibit timers. When some MAC procedures are performed prohibit timers set the earliest time the procedure is allowed to be performed again. MAC procedures currently set these timers when the procedure is performed. Multiple methods or systems may be used to address this, such as 1) Prohibit timers may be no longer set when the procedures are performed and may be now set or not depending on LBT success or failure. Only upon LBT Success for the transmission associated with the MAC procedure should prohibit timers be set. The LBT procedure may take some time to succeed. In this case starting of the prohibit timer may be delayed relative to when the MAC procedure was performed. This may be necessary to ensure the frequency the MAC procedure is performed is properly restricted; or 2) Prohibit timers which may be set upon performing the MAC procedure are cleared if an LBT Failure indication is received for the transmission associated with the MAC procedure. If the LBT procedure results in a delayed transmission the prohibit timer may be extended to take the time from when the MAC procedure was performed to the time when LBT success was determined into account.

Lost Scheduling and Transmission Opportunities

MAC procedures may also take into account downlink assignments and uplink grants. LBT Failures may result in loss of downlink assignments and uplink grants. When the NB determines LBT Failure PDCCH scheduling opportunities may be lost. Also, when the UE determines LBT Failure even though PDCCH scheduling is received the uplink transmission opportunity is lost.

Multiple MAC procedures take actions when downlink assignments or uplink grants may not be received within a configured monitoring time period. LBT Failures or LBT Successes may be taken into account in MAC procedure criteria for not receiving downlink assignments and uplink grants. In addition to uplink or downlink LBT success, failure, indications further LBT procedure information may be provided to MAC procedures. In addition to, or included with the LBT success or failure indication, the period of Clear Channel Assessment (CCA), the selected Maximum Channel Occupancy Time (MCOT), the selected Contention Window Size (CWS), or other timing information is provided to the MAC to allow for proper determination of downlink and uplink transmission opportunities. The MCOT, CWS, or other timing may be identified by the Channel Access Priority Class (CAPC) or another index representing the selected timing.

Multiple options may be considered if during the configured monitoring period when no downlink assignments or uplink grants may be received, LBT Failure is detected or LBT Success is not detected:

If no LBT Success has been detected during the monitoring time period no actions may be taken by the MAC procedure.

If a configured minimum threshold of LBT Success or continuous LBT success detections is not reached within the monitoring time period no actions may be taken by the MAC procedure.

If an LBT Failure has been detected during the monitoring time period no actions may be taken by the MAC procedure.

If a configured maximum threshold of LBT Failure or continuous LBT Failure detections is reached within the monitoring time period no actions may be taken by the MAC procedure.

The number of or the time period of uplink or downlink transmission opportunities may be more accurately determined from CCA, MCOT, CWS, or other timing information.

Actions that are not taken by the MAC procedure are actions that may have been taken by the currently specified MAC procedure when no downlink assignments or uplink grants are received during the configured monitoring period. For example:

If during the time the BWP Inactivity timer is running LBT Failures are detected or LBT Successes are not detected, BWP switching to the Initial or Default BWP will not be performed even though no downlink assignments or uplink grants were received during this period.

If during the time the DRX Active Time LBT Failures are detected or LBT Successes are not detected, the DRX Inactivity may be reset even though no downlink assignments or uplink grants were received during this period.

MAC procedures may also need to take into account when an uplink transmission cannot be made due to LBT Failure. The effect on MAC procedures is the same as when LBT Failures result in lost PDCCH scheduling opportunities. MAC procedures may consider UL transmission failures due to LBT the same as is currently performed currently when no uplink grant is received or when the uplink grant is not acceptable for data available for transmission (e.g., LCP restriction). For e.g., during back-off periods following LBT failure, the MAC procedures may behave as it currently behaves when no uplink grant is received or when the uplink grant is not acceptable for data available for transmission (e.g. LCP restriction).

Conventional MAC procedures may assume when a MAC PDU is provided to the PHY layer it is transmitted. When LBT is performed this will not always be the case. Therefore, MAC procedures that refer to MAC PDU transmission should clarify a transmission considers LBT Success or Failure. This may be accomplished by referring to LBT Success within the MAC procedures or clarifying MAC PDU transmission criteria includes LBT Success.

MAC CE's may be recovered and stored or the events that triggered these MAC CE's are restored so when multiplexing and assembly of the MAC PDU is reperformed, triggering is reevaluated and reported values recalculated.

NR-U LBT Effect on Specific MAC Procedures

The LBT Operation Procedure

A new LBT MAC Procedure may be introduced. This procedure may be used to inform the NB of LBT failures or successes. As described herein, there may be multiple possible effects on UE MAC procedures. In many cases it may be necessary for the NB to know the effect on these MAC procedures for proper operation.

It is possible that each UE MAC procedure affected by LBT Failures signals the effect to the NB to maintain coordination between the UE and NB for the respective MAC procedure. But this may require additional complexity to be introduced to many MAC procedures.

An exemplary way is to define a new separate MAC procedure which indicates LBT State (e.g., Successes or Failures) to the NB so that the NB may take the LBT information into account and adjust its behavior relative to other MAC procedures by realizing the altered behavior of these procedures by LBT operation.

Therefore, UE PHY layer LBT Success or Failure indications may be provided to the MAC. It is possible the PHY layer does some pre-processing to limit the amount of primitives signaled between the MAC and PHY layers. The new LBT MAC procedure may consolidate these LBT indications and may generate a Listen Before Talk Report (LBTR) MAC control element (CE) which may provide information on LBT Failures or Successes over a period of time. In addition to LBT Success or Failure indications, the UE PHY layer may provide LBT timing information to the MAC layer. For example, LBT timing information may include CCA time periods, select MCOT or CWS periods.

The LBTR may provide UL and DL LBT failures separately. UL LBT failures may be unknown to the NB and need to be signaled to maintain MAC procedure coordination. But also DL LBT failures the UE is aware of may be useful to the NB since the NB may not be able to assume what DL LBT failures, that are signaled to the UE or otherwise detected by the UE, were realized by the UE. The UE may have missed or failed to receive NB DL LBT failure or success indications.

The LBTR procedure may require one or more triggers to initiate the procedure resulting in cases of transmitting the LBTR. The triggers may include one or more of the following ways. In a first way, LBT Failures reaching a threshold may be a trigger. There may be an RRC configured LBT Failure threshold. This threshold may be a threshold number of LBT Failures over a known time period or a threshold number of consecutive LBT Failures. These parameters may need to be configurable since the reporting urgency may be dependent of the type of traffic supported. In a second way, a trigger may be when certain effects on other MAC procedures results in a change of operation of that procedure which needs to be known by the NB for proper operation. For example, any change in DRX operation that effects Active Time or the DRX cycle. In this case the MAC DRX procedure triggers the LBTR. In a third way, a trigger may be based on RRC configured periodic LBTRs. In a fourth way, a trigger may be based on an LBTR Prohibit timer being introduced to limit LBTR frequency.

The LBTR procedure may count LBT Failures or Successes over a configured LBTR Monitoring Period. For example:

If LBT Failure Count is greater than a configured LBT Failure Count within a LBTR Monitoring Period an LBTR may be triggered.

If LBT Success Count is less than a configured LBT Success Minimum within a LBTR Monitoring Period an LBTR may be triggered.

The LBTR procedure may count consecutive LBT Failures or Successes over a configured LBTR Monitoring Period.

If consecutive LBT Failure Count is greater than a configured consecutive LBT Failure Count within a LBTR Monitoring Period, an LBTR is triggered.

If consecutive LBT Success Count is less than a configured consecutive LBT Success Minimum within a LBTR Monitoring Period, an LBTR is triggered.

When other MAC Procedures trigger an LBTR this may be by setting an LBTR Pending indication. The LBTR Pending indication is later checked during MAC PDU multiplexing assembly to see an LBTR MAC CE is to be built.

The LBTR may include the following information:

Count of LBT Failures or Successes since the last LBTR

Number of times LBT Failures or consecutive LBT Failures have exceeded a maximum configured LBT Failure threshold since the last LBTR Number of time LBT Success Count or consecutive LBT Success Count is less than a configured consecutive LBT Success Minimum since last LBTR In addition to UL LBT failures DL LBT failures which have been detected by the UE may also be reported The MAC procedure that triggered the LBTR Time stamp related to when the LBTR PDU is built.

CCA, MCOT or CWS information

It should be noted that similar operations may be provided by the PHY layer or RRC layer, and PHY layer or RRC layer signaling may be used to convey similar information to the NB.

RRC may configured into the UE, the priority of the channel access priority class mapped to the logical channel specified for LBTR MAC CE. Alternatively, the access priority class may be specified as the channel access priority class with the highest priority. The LBTR procedure may also comprise a general LBT State determination procedure, or an independent LBT State procedure may be utilized by the LBTR and other MAC procedures. This method would minimize complexity introduced to each MAC procedure. For example, rather than each MAC procedure counting LBT failures affecting the procedure an LBT State would just be checked.

Total number of LBT failures may be counted, which may be within a specified or configured period of time. Alternatively, LBT FC's may count consecutive LBT failures, and upon a LBT success the LBT FC is reset to zero. The period in which LBT failures may be counted may be sliding windows in time. When the LBT failure counter exceeds a specified or configured threshold the LBT State is considered failed. If a specified or configured number of LBT failures have not been received or a specified or configured number of LBT success indications are received the LBT State is considered successful. MAC procedures may check the LBT State rather than counting individual LBT failures associated with associated with the MAC procedure. MAC procedures may adjust counters and timers according to the LBT State. For example, MAC procedures may extend counters and timers, or consider timers and counters to have reached the maximum thresholds depending on the LBT State. The LBT State may also be indicated to higher layers. For example, to effect RRC procedures.

BWP Operation Procedure

The following modifications to the BWP Operation procedure may take into account the effect of LBT operation in NR-U.

It is possible that LBT Failures results in blocking downlink assignments and uplink grants during a period of the BWP Inactivity Timer. In this case it may be inappropriate to perform BWP switching to the Default or Initial BWP(s).

If during the period the BWP Inactivity Timer is running LBT Failure(s) is determined the BWP Inactivity Timer associated with the active DL BWP should be extended. This, may be necessary to ensure BWP switching to the Default or Initial BWP is not performed when downlink assignments and uplink grants may be lost due to LBT Failure. BWP switching to the Default or Initial BWP should only be performed when there is really no data to be transmitted while the BWP Inactivity Timer is running. The examples herein may refer to the MAC specification 3GPP TS 38.321, (NR), Medium Access Control (MAC) protocol specification, V15.2.0 (herein also referred as [2]). Many of the exemplary modifications are underlined herein. For example, the MAC specification may be modified as follows: If the bwp-InactivityTimer is configured, the MAC entity shall for each activated Serving Cell:

1> if the defaultDownlinkBWP is configured, and the active DL BWP is not the BWP indicated by the defaultDownlinkBWP; or 1> if the defaultDownlinkBWP is not configured, and the active DL BWP is not the initialDownlinkBWP:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment; or 2> if LBT Failure has been detected on the active BWP:

3> if there is no ongoing random access procedure associated with this Serving Cell; or 3> if the ongoing Random Access procedure associated with this Serving Cell is successfully completed upon reception of this PDCCH addressed to C-RNTI (e.g., as specified with regard to subclauses 5.1.4 and 5.1.5 of [2]):

4> start or restart the bwp-InactivityTimer associated with the active DL BWP.

The criteria may also be based on LBT Success detections while the BWP Inactivity is running. For example: If the bwp-InactivityTimer is configured, the MAC entity shall for each activated Serving Cell:

1> if the defaultDownlinkBWP is configured, and the active DL BWP is not the BWP indicated by the defaultDownlinkBWP; or 1> if the defaultDownlinkBWP is not configured, and the active DL BWP is not the initialDownlinkBWP:

2> if a PDCCH addressed to C-RNTI or CS-RNTI indicating downlink assignment or uplink grant is received on the active BWP; or 2> if a PDCCH addressed to C-RNTI or CS-RNTI indicating downlink assignment or uplink grant is received for the active BWP; or 2> if a MAC PDU is transmitted in a configured uplink grant or received in a configured downlink assignment; or 2> if no LBT Success has been detected on the active BWP:

3> if there is no ongoing random access procedure associated with this Serving Cell; or 3> if the ongoing Random Access procedure associated with this Serving Cell is successfully completed upon reception of this PDCCH addressed to C-RNTI (e.g., as specified with regard to subclauses 5.1.4 and 5.1.5 of [2]):

4> start or restart the bwp-InactivityTimer associated with the active DL BWP.

The LBT Failure may not be a single instance. It may be multiple LBT Failure or Success detections while the BWP Inactivity Timer is running. Also, as indicated herein, LBT Failure or Success is refers to both uplink LBT or downlink LBT.

A procedure may be defined to count LBT Failures or LBT Successes over a period of time, or to count consecutive LBT Failures or consecutive LBT Successes over a period of time. Only if LBT Failures or consecutive LBT Failure exceeding a configured Maximum LBT Failure Threshold or if LBT Successes or consecutive LBT Successes may be less than a configured Minimum LBT Success Threshold, is the BWP Inactivity Timer restarted. For example, the MAC specification may be modified as follows: If the bwp-InactivityTimer is configured, the MAC entity shall for each activated Serving Cell:
   1> if the defaultDownlinkBWP is configured, and the active DL BWP is not the BWP indicated by the defaultDownlinkBWP; or
   1> if the defaultDownlinkBWP is not configured, and the active DL BWP is not the initialDownlinkBWP:
     2> if a PDCCH addressed to C-RNTI or CS-RNTI indicating downlink assignment or uplink grant is received on the active BWP; or
     2> if a PDCCH addressed to C-RNTI or CS-RNTI indicating downlink assignment or uplink grant is received for the active BWP; or
     2> if a MAC PDU is transmitted in a configured uplink grant or received in a configured downlink assignment; or
     2> if LBT Failure Count has exceeded the LBT Failure Threshold on the active BWP:
        3> if there is no ongoing random access procedure associated with this Serving Cell; or
        3> if the ongoing Random Access procedure associated with this Serving Cell is successfully completed upon reception of this PDCCH addressed to C-RNTI (e.g., as specified with regard to subclauses 5.1.4 and 5.1.5 of [2]):
           4> start or restart the bwp-InactivityTimer associated with the active DL BWP;
           4> reset the LBT Failure Count.

In the above procedures it should be noted that LBT Failure has been detected applies to the period while the BWP Inactivity Timer is running, the period from when a PDCCH for BWP switching is received on the active DL BWP, or PDCCH reception of an uplink grant on or for the active BWP, or a MAC PDU is transmitted or received for a configured grant, to the moment the BWP Inactivity Timer expires.

The BWP Inactivity Timer may be extended by a period different from the initial configured value. The period the BWP Inactivity Timer is extended may be another configured value or a value depending on the amount of detected LBT failures or successes determined.

LBT failures may also trigger switching between configured BWPs. The LBT Failure may not be a single instance. It may be multiple LBT Failure or Success detections within a specified or configured period of time. Also, as indicated herein, LBT Failure or Success may refer to uplink LBT or downlink LBT.

A procedure may be defined to count LBT Failures or LBT Successes over a period of time, or to count consecutive LBT Failures or consecutive LBT Successes over a period of time. Only if LBT Failures or consecutive LBT Failure exceeding a configured Maximum LBT Failure Threshold or if LBT Successes or consecutive LBT Successes are less than a configured Minimum LBT Success Threshold, is the Active BWP switched to an alternate configured Active BWP.

It is also may be necessary to avoid significantly extending the BPW Inactivity timer or even indefinitely extending the Inactivity timer due to LBT failures so that the UE never returns to the Initial or Default BWP. Restarting of the BWP Inactivity Timer then may be limited to a specified or configured maximum. For example, the MAC specification may be modified as follows:

1> if BWP-Inactivity-LBT-Failure-Count> BWP-Inactivity-LBT Failure Threshold on the active BWP; and
   1> if LBT-BWP-InactivityRestartCount<=LBT-BWP-Inactivity-Restart-Threshold:
     2> set the BWP-Inactivity-LBT-Failure-Count to 0;
     2> increment LBT-BWP-InactivityRestartCount by 1;
     2> start or restart the bwp-InactivityTimer associated with the active DL BWP.
   1> If LBT Failure has been detected:
     2> Increment BWP-Inactivity-LBT-Failure-Count.

When the LBT BWP Inactivity Restart Threshold is exceeded the following actions may be taken:
   1> if LBT-BWP-InactivityRestartCount>LBT-BWP-Inactivity-Restart-Threshold:
     2> BWP switching to the Default or Initial BWP is performed;
     2> An indication identifying the BWP is sent to higher layers;
     2> The SCell is deactivated;

Random Access Procedures
Random Access Response Reception

The following modifications to the Random Access Response Reception procedure may take into account the effect of LBT in NR-U.

If the RA Response Window expires but LBT Failures have been detected since the preamble transmission the RA Response Window may be extended. This may be necessary since the NB may have received the preamble transmission, but the Random Access Response is delayed due to LBT Failure. When the UE detects the NB has missed transmission opportunities the RA Response window may be extended.

For example, the MAC specification may be modified as follows:
   1> if ra-ResponseWindow configured in RACH-Config-Common expires, and if the Random Access Response containing Random Access Preamble identifiers that matches the transmitted PREAMBLE_INDEX has not been received; or
   1> if ra-ResponseWindow configured in BeamFailureRecoveryConfig expires and if the PDCCH addressed to the C-RNTI has not been received:
     2> If LBT Failure has been detected:
        3> if the contention-free Random Access Preamble for beam failure recovery request was transmitted by the MAC entity:
           4> restart the ra-ResponseWindow configured in Beam-FailureRecoveryConfig.
           4> monitor the PDCCH of the SpCell for response to beam failure recovery request identified by the C-RNTI while ra-ResponseWindow is running.
        3> else:
           4> restart the ra-ResponseWindow configured in RACH-ConfigCommon;
           4> monitor the PDCCH of the SpCell for Random Access Response(s) identified by the RA-RNTI while the ra-ResponseWindow is running.
     2> else (LBT Failure not detected):
        3> consider the Random Access Response reception not successful;

In the above procedure it should be noted that LBT Failure has been detected applies to the period while the RA Response Window is running, the period from preamble transmission to the moment the RA Response Window expires the first time after preamble transmission, or the period from last time the RA Contention Resolution Timer was restarted upon expiry as a result of LBT detection to the following ra-ResponseWindow expiry.

Alternatively, a procedure may be defined to count LBT Failures or LBT Successes. Only if LBT Failures exceeding a configured Maximum LBT Failure Threshold or if LBT Successes may be less than a configured Minimum LBT Success Threshold, is the RA Response Window restarted.

Alternatively, the RA Response Window may be extended by a period different from the configured value in BeamFailureRecoveryConfig or in RACH-ConfigCommon. The period the RA Response window is extended may be another configured value or a value depending on the amount of detected LBT failures or successes determined. It may also be necessary to avoid significantly extending the RA Response Window or even indefinitely extending the RA Response Window due to LBT failures so that the UE never determines the Random Access Response reception not successful. Restarting of the RA Response Window then may be limited to a specified or configured maximum. For example, the MAC specification may be modified as follows:

1> if RA-ResponseWindow-LBT-Failure-Count>RA-ResponseWindow-LBT-FailureThreshold; and
1> if LBT-RA-ResponseWindowRestartCount<=LBT-RA-ResponseWindow-Restart-Threshold:
2> set the RA-ResponseWindow-LBT-Failure-Count to 0;
2> increment LBT-RA-ResponseWindowRestartCount by 1;
2> start or restart the ra-ResponseWindow.
1> If LBT Failure has been detected:
2> increment RA-ResponseWindow-LBT-Failure-Count.

When the RA-ResponseWindow-LBT-FailureThreshold is exceeded the following actions may be taken:

1> if LBT-RA-ResponseWindowRestartCount>LBT-RA-ResponseWindow-Restart-Threshold:
2> consider the Random Access Response reception not successful.

Another example below. It has been discussed the Preamble Transmission Counter should not be incremented if LBT fails. For example:

1> if ra-ResponseWindow configured in RACH-Config-Common expires, and if the Random Access Response containing Random Access Preamble identifiers that matches the transmitted PREAMBLE_INDEX has not been received; or
1> if ra-ResponseWindow configured in BeamFailureRecoveryConfig expires and if the PDCCH addressed to the C-RNTI has not been received:
2> consider the Random Access Response reception not successful;
2> If LBT Failure has not been detected:
3> increment PREAMBLE_TRANSMISSION_COUNTER by 1;
3> if PREAMBLE_TRANSMISSION_COUNTER= preambleTransMax+1:
4> if the Random Access Preamble is transmitted on the SpCell:
5> indicate a Random Access problem to upper layer
4> if this Random Access procedure was triggered for SI request:
5> consider the Random Access procedure unsuccessfully completed.
3> else if the Random Access Preamble is transmitted on a SCell:
4> consider the Random Access procedure unsuccessfully completed.

The Preamble Transmission Counter may be decremented upon detection of LBT Failure. For example:

1> instruct the physical layer to transmit the Random Access Preamble using the selected PRACH, corresponding RA-RNTI (if available), PREAMBLE_INDEX and PREAMBLE_RECEIVED_TARGET_POWER.
1> If LBT Failure has been detected:
2> decrement PREAMBLE_TRANSMISSION_COUNTER by 1.

In the above procedure it should be noted that LBT Failure may apply to the preamble transmission. There should be an attempt to avoid significantly not incrementing the Preamble Transmission Counter or even indefinitely not incrementing the Preamble Transmission Counter due to LBT failures so that the UE does not determine the Random Access Response reception not successful. Restarting of the RA Response Window then may be limited to a specified or configured maximum. For example, the MAC specification may be modified as follows:

1> if ra-Response Window configured in RACH-Config-Common expires, and if the Random Access Response containing Random Access Preamble identifiers that matches the transmitted PREAMBLE_INDEX has not been received; or
1> if ra-Response Window configured in BeamFailureRecoveryConfig expires and if the PDCCH addressed to the C-RNTI has not been received:
2> consider the Random Access Response reception not successful;
2> if PreambleTransmission LBT Failure has not been detected; or
2> if RA-PreambleTransmission-LBT-Failure-Count>RA-PreambleTransmission-LBT-FailureThreshold:
3> increment PREAMBLE_TRANSMISSION_COUNTER by 1;
3> if PREAMBLE_TRANSMISSION_COUNTER=preambleTransMax+1:
4> if the Random Access Preamble is transmitted on the SpCell:
5> indicate a Random Access problem to upper layer
4> if this Random Access procedure was triggered for SI request:
5> consider the Random Access procedure unsuccessfully completed.
3> else if the Random Access Preamble is transmitted on a SCell:
4> consider the Random Access procedure unsuccessfully completed.
1> If PreambleTransmission-LBT-Failure has been detected:
2> Increment RA-PreambleTransmission-LBT-Failure-Count.

When the RA-PreambleTransmission-LBT-FailureThreshold is exceeded the following actions may be taken: 1) indicate a Random Access problem to upper layers; or 2) consider the Random Access procedure unsuccessfully completed.

Alternatively, the MAC specification may be modified as follows:

1> If PreambleTransmission-LBT-Failure has been detected:
2> Increment RA-PreambleTransmission-LBT-Failure-Count;

2> if RA-PreambleTransmission-LBT-Failure-Count>RA-PreambleTransmission-LBT-FailureThreshold:
3> if the Random Access Preamble is transmitted on the SpCell:
4> indicate a Random Access problem to upper layer
3> if this Random Access procedure was triggered for SI request:
4> consider the Random Access procedure unsuccessfully completed.
3> else if the Random Access Preamble is transmitted on a SCell:
4> consider the Random Access procedure unsuccessfully completed.

Contention Resolution

The following modifications to the Random Access Contention Resolution procedure may take into account the effect of LBT in NR-U.

If the RA Contention Resolution Timer expires but LBT Failures have been detected since the preamble transmission the RA Contention Resolution Timer should be extended. This may be necessary since the NB may have received the MSG3 transmission, but the PDCCH transmission is delayed due to LBT Failure. When the UE detects the NB has missed transmission opportunities due to LBT Failures the RA Contention Resolution Timer is extended.

For example, the MAC specification may be modified as follows:
1> if ra-ContentionResolutionTimer expires:
2> If LBT Failure has been detected:
3> start the ra-ContentionResolutionTimer and restart the ra-ContentionResolutionTimer at each HARQ retransmission;
3> monitor the PDCCH while the ra-ContentionResolutionTimer is running regardless of the possible occurrence of a measurement gap;
2> else:
3> discard the TEMPORARY_C-RNTI;
3> consider the Contention Resolution not successful.

In the above procedure it should be noted that LBT Failure has been detected applies to the period while the RA Contention Resolution Timer is running, the period from MSG3 transmission to the moment the RA Contention Resolution Timer expires the first time after MSG3 transmission, or the period from last time the RA Contention Resolution Timer was started upon expiry as a result of LBT detection to the following RA Contention Resolution Timer expiry.

Alternatively, a procedure may be defined to count LBT Failures or LBT Successes. Only if LBT Failures exceeding a configured Maximum LBT Failure Threshold or if LBT Successes may be less than a configured Minimum LBT Success Threshold, is the RA Contention Resolution Timer restarted.

Alternatively, the RA Contention Resolution Timer may be extended by a period different from the configured RA Contention Resolution Timer. The period the RA Contention Resolution Timer is extended may be another configured value or a value depending on the amount of detected LBT failures or successes determined. It may also be necessary to avoid significantly extending the RA Contention Resolution Timer or even indefinitely extending the RA Contention Resolution Timer due to LBT failures so that the UE never determines Contention Resolution is not successful. Restarting of the RA Contention Resolution Timer then may be limited to a specified or configured maximum. For example, the MAC specification may be modified as follows:

1> if RA-ContentionResolution-LBT-Failure-Count>RA-ContentionResolution-LBT-FailureThreshold; and
1> if LBT-RA-ContentionResolutionTimerRestartCount<=LBT-RA-ContentionResolutionRestart-Threshold:
2> set the RA-ContentionResolution-LBT-Failure-Count to 0;
2> increment LBT-RA-ContentionResolutionTimerRestartCount by 1;
2> start the ra-ContentionResolutionTimer and restart the ra-ContentionResolutionTimer at each HARQ retransmission;
2> monitor the PDCCH while the ra-ContentionResolutionTimer is running regardless of the possible occurrence of a measurement gap;
1> if LBT Failure has been detected:
2> increment RA-ContentionResolution-LBT-Failure-Count.

When the RA-ContentionResolution-LBTRestartThreshold is exceeded the following actions may be taken:
1> if LBT-RA-ContentionResolutionTimerRestartCount>LBT-RA-ContentionResolutionRestart-Threshold:
2> consider the Random Access Response reception not successful.

Random Access Preamble Transmission

The following modifications to the Random Access Preamble Transmission procedure to take into account the effect of LBT in NR-U.

It has been discussed the Preamble Power Ramping Counter should not be incremented if LBT fails. For example:

The MAC entity shall, for each Random Access Preamble:
1> if PREAMBLE_TRANSMISSION_COUNTER is greater than one; and
1> if the notification of suspending power ramping counter has not been received from lower layers; and
1> if SSB selected is not changed (i.e. same as the previous Random Access Preamble transmission); and
1> If LBT Failure has not been detected:
2> increment PREAMBLE_POWER_RAMPING_COUNTER by 1.

The preamble Power Ramping Counter may be decremented upon detection of LBT Failure. For example:
1> instruct the physical layer to transmit the Random Access Preamble using the selected PRACH, corresponding RA-RNTI (if available), PREAMBLE_INDEX and PREAMBLE_RECEIVED_TARGET_POWER.
2> If LBT Failure has been detected:
2> decrement PREAMBLE_POWER_RAMPING_COUNTER by 1.

In the above procedure it should be noted that LBT Failure may apply to the preamble transmission.

Power Headroom Reporting

The following modifications to the PHR procedure to take into account the effect of LBT in NR-U.

When PHR MAC CE transmission is blocked by LBT Failure, and retransmitted later in time additional signaling is introduced to inform the NB when the PHR was calculated or inform the NB of the transmission conditions when the PHR was calculated.

In order for the NB to properly process PHR it may be necessary for the NB to know under what conditions the PHR was calculated.

PHR calculates about the difference between the nominal UE maximum transmit power and the estimated power for UL-SCH transmission or SRS transmission per activated Serving Cell and also with information about the difference between the nominal UE maximum power and the estimated power for UL-SCH and PUCCH transmission on SpCell and PUCCH SCell.

Existing PHR signaling identifies if the UL-SCH transmission was based on a real transmission or a virtual transmission, and if a PUCCH was transmitted when the PHR was calculated. When the UL-SCH is a real transmission it may be necessary for the NB to know what was transmitted at the time of PHR calculation.

When not operating in unlicensed spectrum and LBT is not used the NB can determine when the PHR calculation was made. Since the NB is aware of what scheduled and received it can interpret the PHR by knowing what was transmitted on the UL-SCH at this time. But when LBT Fails and the transmission is delayed until LBT Success it is not possible for the NB to determine what was transmitted in UL-SCH at the time of PHR calculation.

Below are multiple ways to address this problem. In a first way, provide an additional indication to the PHR that allows the NB to determine when the PHR calculation was made. This may be the delay caused by LBT relative to the time of the first LBT failure, or it may be an absolute time reference. In a second way, provide additional information with the PHR that informs the NB of what was transmitted on the UL-SCH. This may be an indexed value approximating what was transmitted on the UL-SCH, or it may be physical details of the transmission at the time of PHR calculation. In a third way, LBT Failures or Successes may be independently indicated to the NB so that the NB may determine the effective delay incurred by LBT for the PHR. In a fourth way, provide additional information with the PHR that informs the NB of the grant (e.g. uplink grant) used when the PHR was calculated.

It is preferred but it is not absolute necessary for the NB to receive additional information which allows the NB to know how the PHR was calculated. Alternatively, the NB may at least know when a real PHR is providing inaccurate information. This may be accomplished by the UE indicating LBT Failure and Success to the NB, allowing the NB to determine there were LBT Failures which delayed the PHR.

Another example below. PHR Triggering conditions should consider LBT Failures. Available UL resources, PHR Periodic Timer expiration, PHR reconfiguration, SCell Activation, and PSCell addition, triggering criteria should only be considered when LBT succeeds. The addition of LBT criteria is mutually exclusive for each existing trigger, and may therefore only affect a subset of the existing criteria.

For example (where all triggers may be considered), the MAC specification may be modified as follows:
A Power Headroom Report (PHR) shall be triggered if any of the following events occur:
  phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission and this transmission is not blocked by LBT Failure;
  NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.
  phr-PeriodicTimer expires and LBT subsequently succeeds;
  upon configuration or reconfiguration of the power headroom reporting functionality by upper layers and LBT subsequently succeeds, which is not used to disable the function;
  activation of an SCell of any MAC entity with configured uplink and LBT subsequently succeeds;
  addition of the PSCell (i.e. PSCell is newly added or changed) and LBT subsequently succeeds;
  phr-ProhibitTimer expires or has expired, when the MAC entity has UL resources for new transmission and this transmission is not blocked by LBT Failure, and the following is true for any of the activated Serving Cells of any MAC entity with configured uplink:
    there are UL resources allocated for transmission or there is a PUCCH transmission on this cell, and the required power backoff due to power management (as allowed by P-MPR$_c$ as specified in TS 38.101 [10]) for this cell has changed more than phr-Tx-PowerFactorChange dB since the last transmission of a PHR when the MAC entity had UL resources allocated for transmission or PUCCH transmission on this cell.

These changes may be necessary so that PHR is calculated or transmitted when LBT Succeeds and the UE has access to the channel.

Another example below. PHR calculation and transmission should only be considered when LBT succeeds.

Calculation of the difference between the nominal UE maximum transmit power and the estimated power for UL-SCH transmission or SRS transmission per activated Serving Cell and also with information about the difference between the nominal UE maximum power and the estimated power for UL-SCH and PUCCH transmission on SpCell and PUCCH SCell should only be considered when LBT Succeeds.

When checking if UL resources can accommodate a PHR MAC CE it may also be necessary to determine LBT Success. Having available UL resources does not matter of the PHR MAC CE transmission is blocked due to LBT.

For example, the MAC specification may be modified as follows:
If the MAC entity has UL resources allocated for a new transmission and LBT Success is determined the MAC entity shall:
  1> if it is the first UL resource allocated for a new transmission since the last MAC reset:
    2> start phr-PeriodicTimer;
  1> if the Power Headroom reporting procedure determines that at least one PHR has been triggered and not cancelled, and;
  1> if the allocated UL resources can accommodate the MAC CE for PHR which the MAC entity is configured to transmit, plus its subheader, as a result of logical channel prioritization, and;
  1>LBT Success is determined:
    2> if multiplePHR is configured:
    3> for each activated Serving Cell with configured uplink associated with any MAC entity:
      4> obtain the value of the Type 1 or Type 3 power headroom for the corresponding uplink carrier;
      4> if this MAC entity has UL resources allocated for transmission on this Serving Cell and LBT Success is determined; or 4> if the other MAC entity, if configured, has UL resources allocated for transmission and LBT Success is determined on this Serving Cell and phr-ModeOtherCG is set to real by upper layers:
5> obtain the value for the corresponding $P_{CMAX,f,c}$ field from the physical layer.
3> if phr-Type2SpCell is configured:
4> obtain the value of the Type 2 power headroom for the SpCell of this MAC entity;
4> obtain the value for the corresponding $P_{CMAX,f,c}$ field from the physical layer.
3> if phr-Type2OtherCell is configured:
4> if other CG is configured:
5> obtain the value of the Type 2 power headroom for the SpCell of the other MAC entity;
5> if phr-ModeOtherCG is set to real by upper layers:
6> obtain the value for the corresponding $P_{CMAX,f,c}$ field for the SpCell of the other MAC entity from the physical layer.
4> else if PUCCH SCell is configured and activated:
5> obtain the value of the Type 2 power headroom for the PUCCH SCell;
5> obtain the value for the corresponding $P_{CMAX,f,c}$ field from the physical layer.
3> when LBT Success is determined instruct the Multiplexing and Assembly procedure to generate and transmit a PHR MAC CE according to configured ServCellIndex and the PUCCH(s) for the MAC entity as defined in subclause 6.1.3.9 of [2] based on the values reported by the physical layer.
2> else (i.e. Single Entry PHR format is used):
3> obtain the value of the Type 1 power headroom from the physical layer for the corresponding uplink carrier of the PCell;
3> obtain the value for the corresponding $P_{CMAX,f,c}$ field from the physical layer;
3> when LBT Success is determined instruct the Multiplexing and Assembly procedure to generate and transmit a PHR MAC CE as defined in subclause 6.1.3.8 of [2] based on the value reported by the physical layer.
2> start or restart phr-PeriodicTimer;
2> start or restart phr-ProhibitTimer;
2> cancel all triggered PHR(s).

While the exemplary MAC specific change above is described in terms of LBT success, the example may also be equally expressed in terms of no LBT Failure. In this example it should be noted the changes are mutually exclusive. Only a subset of the disclosed changes may be necessary.

Another example below. Additionally, it is disclosed that upon detection of LBT Failure of a transmission including a MAC PHR CE, the PHR Prohibit timer should not be set or it should be cleared if it was set.

When the physical layer is instructed to transmit a MAC PDU including a MAC PHR CE, the PHR prohibit timer should only be started or restarted upon determination of LBT success for the MAC PDU transmission. For example, the MAC specification may be modified as follows:
1> If LBT Success is determined;
2> start or restart phr-PeriodicTimer;
2> start or restart phr-ProhibitTimer;
2> cancel all triggered PHR(s).

While the exemplary MAC specific change above is described in terms of LBT success, the example may also be expressed in terms of no LBT Failure.

Alternatively, the PHR Prohibit Timer or the PHR Periodic Timer may be started as it is done in the existing procedure, but if LBT Failure is determined the PHR Prohibit timer may be cleared or the PHR Periodic Timer may be reset to the remaining value before the last reset because of LBT failure, or to a different time value for e.g. a configured time value.

This modification may be necessary to ensure the PHR Prohibit Timer is not set so that subsequent PHR transmissions may be not delayed, or the PHR Periodic Timer is not reset so that periodic PHR are not delayed when an PHR transmission is blocked by LBT Failure.

Activation/Deactivation of SCells

The following modifications to the Activation/Deactivation of SCells procedure to take into account the effect of LBT in NR-U.

If LBT Failure has been detected while the SCell Deactivation Timer was running, the SCell Deactivation Timer is extended. This may be necessary to avoid unintended SCell Deactivations.

When the UE detects the NB has missed DL transmission opportunities (downlink assignment(s) may be lost), or UL transmissions may be blocked (a MAC PDU is not transmitted) due to LBT Failures the SCell Deactivation Timer is extended.

There may be multiple options how this may be accomplished:
Upon LBT Failure detection the SCell Deactivation Timer is extended or restarted
Upon SCell Deactivation Timer expiration if LBT Failure is detected the SCell Deactivation Timer is extended or restarted.

It should be noted when LBT failure is referred to, it may also mean lack of LBT success. For example, the UE PHY layer may indicate LBT failure to UE MAC or the NB may indicate LBT success to UE MAC.

For example, the MAC specification may be modified as follows:
1> else if an SCell Activation/Deactivation MAC CE is received deactivating the SCell; or
1> if the sCellDeactivationTimer associated with the activated SCell expires and LBT Failure has not been detected:
2> deactivate the SCell according to the timing defined in TS 38.213;
2> stop the sCellDeactivationTimer associated with the SCell;
2> stop the bwp-InactivityTimer associated with the SCell;
2> clear any configured downlink assignment and any configured uplink grant Type 2 associated with the SCell respectively;
2> suspend any configured uplink grant Type 1 associated with the SCell;
2> flush all HARQ buffers associated with the SCell.
1> if the sCellDeactivationTimer associated with the activated SCell expires and LBT Failure has been detected:
2> restart the sCellDeactivationTimer associated with the SCell.

In the above procedure(s) it should be noted that LBT Failure has been detected applies to the period while the SCell Deactivation Timer is running, the period from SCell Activation, or from when the last MAC PDU is transmitted in a configured uplink grant or from the last time the UE received in a configured downlink assignment to the moment the SCell Deactivation Timer expires the first time after it has been set, or the period from last time the SCell Deactivation Timer was started upon expiry as a result of LBT detection to the following SCell Deactivation Timer expiry.

Alternatively upon LBT Failure detection on the SCell:
1> If LBT Failure has been detected:
2> restart the sCellDeactivationTimer associated with the SCell.

Alternatively, a procedure may be defined to count LBT Failures or LBT Successes, or to consecutive LBT Failures or consecutive LBT success. Only if LBT Failures or consecutive LBT Failures exceeding a configured Maximum LBT Failure Threshold or if LBT Successes or consecutive LBT Successes may be less than a configured Minimum LBT Success Threshold, is the SCell Deactivation Timer restarted. For example the MAC specification may be modified as follows:
1> If ScellDeactLBT-Failure-Count>ScellDeactLBT-Failure-Threshold:
2> restart the sCellDeactivationTimer associated with the SCell;
2> set the ScellDeactLBT-Failure-Count to 0;
1> If an LBT failure has occurred:
2> increment the ScellDeactLBT-Failure-Count;

Alternatively, the SCell Deactivation Timer may be extended by a period different from the configured SCell Deactivation Timer. The period the SCell Deactivation Timer is extended may be another configured value or a value depending on the amount of detected LBT failures or successes determined. It may also be necessary to avoid significantly extending the SCell Deactivation Timer or even indefinitely extending the SCell Deactivation Timer due to LBT failures so that the UE never deactivates. Restarting of the SCell Deactivation Timer then may be limited to a specified or configured maximum. For example, the MAC specification may be modified as follows:
1> if ScellDeact-LBT-Failure-Count>ScellDeact-LBT-FailureThreshold; and
1> if LBT-ScellDeactTimerRestartCount<=LBT-ScellDeact-Restart-Threshold:
2> set the ScellDeact-LBT-Failure-Count to 0;
2> increment LBT-ScellDeactTimerRestartCount by 1;
2> restart the sCellDeactivationTimer associated with the SCell;
1> if LBT Failure has been detected:
2> increment ScellDeact-LBT-Failure-Count.

When the ScellDeact-LBT-FailureThreshold is exceeded the following actions may be taken:
1> if LBT-ScellDeactTimerRestartCount<=LBT-ScellDeact-Restart-Threshold:
2> deactivate the SCell according to the timing defined in TS 38.213 [6];
2> stop the sCellDeactivationTimer associated with the SCell;
2> stop the bwp-InactivityTimer associated with the SCell;
2> clear any configured downlink assignment and any configured uplink grant Type 2 associated with the SCell respectively;
2> suspend any configured uplink grant Type 1 associated with the SCell;
2> flush all HARQ buffers associated with the SCell.

Discontinuous Reception (DRX)

The following modifications to the DRX procedure to take into account the effect of LBT in NR-U.

There may be a transition from the Short DRX cycle to the Long DRX cycle when the short cycle timer expires should only be performed when LBT Success has been detected or LBT Failure has not been detected. For example:
1> if drx-ShortCycleTimer expires and LBT Success has been detected:
1> use the Long DRX cycle.
1> else
2> Start or restart the drx-ShortCycleTimer Disclosed herein is a Maximum LBT Failure or Minimum LBT Success configured threshold. And only if the count of LBT Failures or LBT Successes exceeds the threshold then the UE may remain using the DRX Short cycle. For example:
1> if drx-ShortCycleTimer expires and the LBT Success Counter exceeds the Minimum LBT Success Threshold:
2> use the Long DRX cycle.
2> else
2> Start or restart the drx-ShortCycleTimer Alternatively, if LBT Failure is detected or LBT Success is not detected to extend DRX Active Time. This may be accomplished by starting or restarting the DRX Inactivity Timer. This also may result in continuing to use the DRX Short cycle since upon expiration of the DRX Inactivity timer the DRX Short Cycle timer is started or restarted. Additionally, this may allow for further PDCCH UL & DL scheduling opportunities, which may be necessary due to the scheduling opportunities lost due to LBT Failure. For example, the MAC specification may be modified as follows:
3> if the PDCCH indicates a new transmission (DL or UL);
4> start or restart drx-InactivityTimer in the first symbol after the end of the PDCCH reception.
3> if LBT Failure has been detected:
4> start or restart drx-InactivityTimer.

Preferably starting or restarting the DRX Inactivity timer is dependent on multiple occurrences of detecting LBT Failure or not detecting LBT Success during a period of time. The period of time may be the period of On Duration or the period of the Inactivity Timer, the combination of the On Duration and the time the Inactivity Timer is running. For example:
1> When the drx-onDurationTimer expires if LBT Success has not been detected:
2> start or restart drx-InactivityTimer
1> When the drx-InactivityTimer expires if LBT Success has not been detected:
2> start or restart drx-InactivityTimer The LBT Failure may not be a single instance. It may be multiple LBT Failure or Success detections. The DRX procedure may be initiated only after a series of LBT Failures affecting UE reception of PDDCH.

A procedure may be defined to count LBT Failures or LBT Successes, to count consecutive LBT Failures or consecutive LBT Successes. Only if LBT Failures or consecutive LBT Failures exceeding a configured Maximum LBT Failure Threshold or if LBT Successes or consecutive LBT Successes may be less than a configured Minimum LBT Success Threshold, is the DRX Inactivity Timer restarted. For example:
1> When the OnDuration Timer expires if LBT Success Count is less than the LBT Minimum Success Threshold:
2> start or restart drx-InactivityTimer It may also be necessary to avoid significantly extending the DRX Inactivity Timer or even indefinitely extending the DRX Inactivity Timer due to LBT failures, so that the UE never enters DRX. Restarting of the DRX Inactivity Timer then may be limited to a specified or configured maximum. For example, the MAC specification may be modified as follows:

1> if DRX-Inactivity-LBT-Failure-Count>DRX-Inactivity-LBT-FailureThreshold; and
    1> if DRX-Inactivity-TimerRestartCount<=DRX-Inactivity-Restart-Threshold:
        2> set the DRX-Inactivity-LBT-Failure-Count to 0;
        2> increment DRX-Inactivity-TimerRestartCount by 1;
        2> start or restart drx-InactivityTimer;
    1> if LBT Failure has been detected:
        2> increment DRX-Inactivity-LBT-Failure-Count.

When the DRX-Inactivity-LBTRestartThreshold is exceeded the following actions may be taken:

1> if DRX-Inactivity-TimerRestartCount>DRX-Inactivity-Restart-Threshold
    2> if the Short DRX cycle is configured:
        3> start or restart drx-ShortCycleTimer in the first symbol after the expiry of drx-InactivityTimer or in the first symbol after the end of DRX Command MAC CE reception;
        3> use the Short DRX Cycle.
    2> else:
        3> use the Long DRX cycle.

Extending DRX Active Time when LBT Failures occur by starting or restarting the Inactivity Time should be a configurable option or dependent on what services may be currently active. For example when URLLC services may be supported it is much more important to maintain scheduling opportunities when LBT Failures occur.

Alternatively, the amount of time DRX Active Time is extended may be different from the period of the configured DRX In Activity Timer. It may be another configured value, or preferably it may be a period relative the amount of LBT Failures detected during the current DRX Active Time period.

In another example, there may be a method to address the DRX inefficiencies caused by LBT operation by dynamically adapting DRX procedures. When the UE wakes each DRX cycle the DRX configuration may be dynamically adjusted according to LBT operation. For example, the DRX On Duration, In Activity or DRX cycles may be periodically adjusted. This may be each DRX cycle.

Before transmission the NB determines Clear Channel Assessment (CCA) and selects a Channel Access Priority Class (CAPC). For the CAPC a Maximum Channel Occupancy Time (MCOT) and Contention Window Size (CWS) is selected. Transmissions can occur during the MCOT period, while during the CCA and CWS periods transmission cannot occur. Since transmission timing may be dynamically adjusted, the UE DRX operation may be dynamically adjusted to better match transmission opportunities determined by the NB.

To accomplish this, in addition to, or included with downlink LBT success indications signaled from the NB each DRX cycle, the CCA period, the selected MCOT or CWS, or other timing information may be provided to the MAC to allow for more accurate determination of downlink and uplink transmission opportunities. The MCOT, CWS, or other timing may be identified by the Channel Access Priority Class (CAPC) or another index representing the selected timing.

Based on reception of LBT timing information the UE DRX procedure dynamically adjusts Active Time to align with MCOT time periods and apply DRX during CWS and potentially CCA time periods.

For example, at the start of each DRX cycle the On Duration may be set to the MCOT selected by the NB. Similarly, the Inactivity timer may be set to align with the selected MCOT.

Alternatively, the UE may enter DRX during CWS and potentially CCA time periods. For example, Active Time would only include On Duration and Inactivity time periods that are overlapped with MCOT periods, or that are not overlapped by CWS and potentially CCA time periods. For example, the MAC specification may be modified as follows:

When a DRX cycle is configured, the Active Time includes the time while:
    drx-onDurationTimer or drx-InactivityTimer or drx-RetransmissionTimerDL or drx-RetransmissionTimerUL or ra-ContentionResolutionTimer (as described in subclause 5.1.5) is running; and
    drx-MCOT-Timer is running.

Or alternatively:

When a DRX cycle is configured, the Active Time includes the time while:
    drx-onDurationTimer or drx-InactivityTimer or drx-RetransmissionTimerDL or drx-RetransmissionTimerUL or ra-ContentionResolutionTimer (as described in subclause 5.1.5) is running; and
    drx-CWS-Timer is not running.

Scheduling Request

The following modifications to the SR procedure to take into account the effect of LBT in NR-U.

If there is an SR pending and LBT Failure has been determined, potentially over a period of time, a Random Access procedure should be initiated and the pending SR cancelled. This may be necessary in case PUCCH resources become unusable due to LBT Failure. In this case the RA procedure will be attempted, and if this procedure fails Radio Link Failure will be declared to resolve the problem. For example, the MAC specification may be modified as follows:

As long as at least one SR is pending, the MAC entity shall for each pending SR:
    1> if the MAC entity has no valid PUCCH resource configured for the pending SR: or
    1> if LBT Failure has been determined;
        2> initiate a Random Access procedure (e.g., see subclause 5.1 of [2]) on the SpCell and cancel the pending SR.

The validity of PUCCH resources may also be defined relative to LBT Successes or LBT Failures. For example, the MAC specification may be modified as follow:

Only PUCCH resources on a BWP which is active at the time of SR transmission occasion where no LBT Failure has been determined, are considered valid.

As long as at least one SR is pending, the MAC entity shall for each pending SR:
    1> if the MAC entity has no valid PUCCH resource configured for the pending SR:
        2> initiate a Random Access procedure (e.g., see subclause 5.1 of [2]) on the SpCell and cancel the pending SR.

While the examples above may be expressed in terms of "no LBT Failure" detection, they may also be expressed in terms of "LBT success" detection. The LBT Failure or LBT success may not be a single instance. It may be multiple LBT Failure or Success detections. The RA procedure may initiated only after a series of LBT Failures affecting SR transmission on PUCCH.

A procedure may be defined to count LBT Failures or LBT Successes, or to count consecutive LBT Failures or consecutive LBT Successes. Only if LBT Failures or consecutive LBT Failures exceeding a configured Maximum LBT Failure Threshold or if LBT Successes or consecutive LBT Successes may be less than a configured Minimum LBT Success Threshold, is the Random Access procedure initiated.

Another example below. When the physical layer is instructed to transmit an SR, the SR prohibit timer may only be started and the SR Counter incremented upon determination of LBT success for the SR transmission. For example, the MAC specification may be modified as follows:

2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap; and
2> if the PUCCH resource for the SR transmission occasion does not overlap with a UL-SCH resource:
3> if SR_COUNTER<sr-TransMax:
4> instruct the physical layer to signal the SR on one valid PUCCH resource for SR;
If LBT Success is determined;
5> start the sr-ProhibitTimer.
5> increment SR_COUNTER by 1;

Alternatively, the SR Prohibit Timer may be started and the SR Counter incremented as it is done in the existing procedure, but if LBT Failure is determined the Prohibit timer may be stopped and the SR Counter may be decremented.

This modification may be necessary to ensure the SR Prohibit Timer, delaying subsequent SR transmissions is not set and so that the SR Counter does not reach SR Trans Max, resulting in releasing physical resources and initiating RA procedure when an SR transmission is blocked by LBT Failure.

It may also be necessary to avoid significantly not incrementing the SR Transmission Counter or even indefinitely not incrementing the SR Transmission Counter due to LBT failures so that the UE never determines the SR transmission procedure not successful. Not incrementing the SR transmission count may be limited to a specified or configured maximum. For example, the MAC specification may be modified as follows:

2> if SR LBT Failure has not been detected; or
2> if SR-Transmission-LBT-Failure-Count>SR-Transmission-LBT-FailureThreshold:
3> increment SR_COUNTER by 1;
3>
2> If SRTransmission-LBT-Failure has been detected:
2> Increment SRTransmission-LBT-Failure-Count.

When the RA-PreambleTransmission-LBT-FailureThreshold is exceeded the following actions may be taken:
Alternatively, the MAC specification may be modified as follows:

2> If SR-Transmission-LBT-Failure has been detected:
2> Increment SR-Transmission-LBT-Failure-Count
2> If SR-Transmission-LBT-Failure-Count>STransmission-LBT-FailureThreshold:

Another example below. Pending SR(s) may only be cancelled and SR Prohibit Timer may only be stopped when LBT success is determined for BSR transmission. This may be necessary to ensure the Prohibit Timer, delaying subsequent SR transmissions is not set when the current SR is not transmitted due to LBT Failure.

For example, all pending SR(s) triggered prior to MAC PDU assembly shall be cancelled and each respective sr-ProhibitTimer shall be stopped when LBT success is determined for MAC PDU transmission and this PDU includes a BSR MAC CE which contains buffer status up to (and including) the last event that triggered a BSR (see subclause 5.4.5 of [2]) prior to MAC PDU assembly.

The example above may also be expressed in terms of LBT failure detection instead of LBT success detection as follows. All pending SR(s) triggered prior to MAC PDU assembly shall be cancelled and each respective sr-ProhibitTimer shall be stopped when no LBT failure is determined for MAC PDU transmission and this PDU includes a BSR MAC CE which contains buffer status up to (and including) the last event that triggered a BSR (see subclause 5.4.5 of [2]) prior to MAC PDU assembly.

Alternatively, Pending SR(s) may be cancelled and Prohibit Timers may be stopped when the MAC PDU including the BSR is provided to the PHY layer as it is done in the existing procedure, but if LBT failure (or equivalently no LBT success) is determined the Pending SR(s) may be restored and the Prohibit Timer restarted.

Buffer Status Reporting

The following modifications to the BSR procedure to take into account the effect of LBT in NR-U.

If a Regular BSR has been triggered and there may be UL-SCH resources available for transmission, but the transmission is blocked by LBT Failure an SR may be triggered. This may be necessary since if the available grant is lost due to LBT Failure a new SR may be needed to help ensure a subsequent grant is made available for transmission of the BSR. For example, the MAC specification may be modified as follows:

2> if a Regular BSR has been triggered and logicalChannelSR-DelayTimer is not running:
3> if there is no UL-SCH resource available for a new transmission; or
3> if the MAC entity is configured with configured uplink grant(s) and the Regular BSR was not triggered for a logical channel for which logical channel SR masking (logicalChannelSR-Mask) is setup by upper layers; or
3> if the UL-SCH resources available for a new transmission do not meet the LCP mapping restrictions (see subclause 5.4.3.1 of [2]) configured for the logical channel(s) that triggered the BSR(s); or
3> if there are UL-SCH resources available for transmission and LBT Failure has been detected for this transmission:
4> trigger a Scheduling Request.

While the modified text above is described in terms of LBT Failure, it may have been also expressed in terms of no LBT Success.

The LBT Failure or LBT Success may not be a single instance. It may be multiple LBT Failure or Success detections. An SR may be triggered only after a series of LBT Failures affecting MAC BSR CE transmission.

A procedure may also be defined to count LBT Failures or LBT Successes, or to count consecutive LBT Failures or consecutive LBT Successes. Only if LBT Failures or consecutive LBT Failures exceeding a configured Maximum LBT Failure Threshold or if LBT Successes or consecutive LBT Successes may be less than a configured Minimum LBT Success Threshold, is an SR triggered.

When BSR MAC CE transmission is blocked by LBT Failure, and retransmitted later in time additional signaling is introduced to inform the NB when the BSR was calculated or inform the NB of the transmission conditions when the PHR was calculated.

In order for the NB to properly process BSR it may be necessary for the NB to know when the BSR was calculated.

When not operating in unlicensed spectrum and LBT is not used the NB may roughly obtain when the content of the BSR was determined. Since the NB is aware of what scheduled and received and the rules for BSR, it may adequately interpret the BSR. But when LBT Fails and the transmission is delayed until LBT Success, the NB may receive an out dated BSR or inaccurate BSR leading potentially to more resource assignment than required by the UE, or less resources than needed by UE or transmission delay and QoS assurance penalty. Below are multiple ways to address this problem. In a first way, provide an additional indication to the BSR that allows the NB to determine when the BSR was built. This may be the delay caused by LBT relative to the time of the first LBT failure, or it may be an absolute time reference. In a second way, LBT Failures or Successes may be independently indicated to the NB so that the NB may determine the effective delay incurred by LBT for the BSR. In a third way, provide additional information with the PHR that informs the NB of the grant (e.g. uplink grant) used when the PHR was calculated.

It is preferred but it is not necessary for the NB to receive additional information which allows the NB to know when the BSR was built. Alternatively, the NB must at least know when a BSR is providing inaccurate information. This may be accomplished by the UE indicating LBT Failure and Success to the NB, allowing the NB to determine there were LBT Failures which delayed the BSR.

Another example is below. BSR Triggering conditions should consider LBT Failures. New data becoming available and fulfilling the currently specified regular BSR triggering criteria, padding BSR triggering condition, BSR Retransmission Timer expiration, BSR Periodic Timer expiration, triggering criteria should only be considered when LBT succeeds. The addition of LBT criteria is mutually exclusive for each existing trigger, and may therefore only affect a subset of the existing criteria.

For example (where all triggers may be considered), the MAC specification may be modified as follows:
A BSR shall be triggered if any of the following events occur:
    the MAC entity has new UL data available for a logical channel which belongs to an LCG; and either
        the new UL data belongs to a logical channel with higher priority than the priority of any logical channel containing available UL data which belong to any LCG and LBT subsequently succeeds; or
        none of the logical channels which belong to an LCG contains any available UL data and LBT subsequently succeeds.
    in which case the BSR is referred below to as 'Regular BSR';
    UL resources are allocated and number of padding bits is equal to or larger than the size of the Buffer Status Report MAC CE plus its subheader and LBT subsequently succeeds, in which case the BSR is referred below to as 'Padding BSR';
    retxBSR-Timer expires, and at least one of the logical channels which belong to an LCG contains UL data and LBT subsequently succeeds, in which case the BSR is referred below to as 'Regular BSR';

periodicBSR-Timer expires and LBT subsequently succeeds, in which case the BSR is referred below to as 'Periodic BSR'.

The MAC entity shall:
    1> if the Buffer Status reporting procedure determines that at least one BSR has been triggered and not cancelled:
        2> if UL-SCH resources are available for a new transmission and LBT Success is determined:
            3> instruct the Multiplexing and Assembly procedure to generate the BSR MAC CE(s);
            3> start or restart periodicBSR-Timer except when all the generated BSRs are long or short Truncated BSRs;
            3> start or restart retxBSR-Timer.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission and LBT Success is determined but is not sufficient to additionally accommodate the BSR MAC CE plus its subheader. All BSRs triggered prior to MAC PDU assembly shall be cancelled when LBT Success is determined and a MAC PDU which includes a BSR MAC CE is transmitted and.

While the modified text above is described in terms of LBT Success, it may have been also expressed in terms of no LBT Failure.

The LBT Failure or LBT Success may not be a single instance. It may be multiple LBT Failure or Success detections. An SR may be triggered only after a series of LBT Failures affecting MAC BSR CE transmission.

A procedure may also be defined to count LBT Failures or LBT Successes, or to count consecutive LBT Failures or consecutive LBT Successes. Only if LBT Failures or consecutive LBT Failures exceeding a configured Maximum LBT Failure Threshold or if LBT Successes or consecutive LBT Successes may be less than a configured Minimum LBT Success Threshold, is an SR triggered.

While the exemplary MAC specific change above is described in terms of LBT success, the example may also be equally expressed in terms of no LBT Failure.

Alternatively, the BSR Periodic Timer and the BSR Retransmission Timer may be started or restarted as it is done in the existing procedure, but if LBT Failure is determined the BSR Periodic Timer and BSR Retransmission Timer is reset to the remaining value before the last reset because of LBT failure, or to a different time value for e.g. a configured time value.

This modification may be necessary to ensure the BSR Periodic Timer or BSR Retransmission Timer may be not reset so that periodic BSR or retransmission of BSR may not be delayed when an BSR transmission is blocked by LBT Failure.

Logical Channel Prioritization (LCP) Procedure

The following modifications to the LCP procedure may take into account the effect of LBT in NR-U.

In the case of LBT Failure being detected in advance of transmission a MAC PDU should not be generated.

For example, the MAC specification may be modified as follows:

The MAC entity shall not generate a MAC PDU for the HARQ entity if the following conditions are satisfied:

the MAC entity is configured with skipUplinkTxDynamic and the grant indicated to the HARQ entity was addressed to a C-RNTI, or the grant indicated to the HARQ entity is a configured uplink grant; and there is no aperiodic CSI requested for this PUSCH transmission as specified in TS 38.212 and the MAC PDU includes zero MAC SDUs; and the MAC PDU includes only the periodic BSR and there is no data available for any LCG, or the MAC PDU includes only the padding BSR; or LBT Failure has not been detected.

Alternatively, the criteria may be LBT Success is detected.

This modification may be necessary since this MAC PDU may not be acceptable for a subsequent grant (e.g. due to size of the UL grant), and MAC CE(s) generated may provide incorrect information at the time of MAC PDU transmission (e.g., PHR, BSR . . . ).

Another example below. Alternatively, the MAC PDU may be generated and provided to the physical layer, but upon LBT Failure detection for this MAC PDU the LCP procedure is restarted to generate a new MAC PDU.

To accomplish this MAC SDU's that were incorporated within this MAC PDU may be preserved until LBT success is determined. These MAC SDUs may then be reprocessed rather than having to recreate these MAC SDUs from the already built MAC PDU.

The simpler case is if the grant is larger, UE removes padding and multiplex additional data according to LCP in the remaining space or does the UE back out the sub-PDUs (MAC SDU's and CE's) and reperform LCP as if the data was never processed for the previous grant.

But even in this case you may have already built MAC CE's which were determined earlier In LAA they allow the old PHR CE. The network may then not know how the PHR was calculated, based on what transmissions.

Rebuilding the CE's is complex since the timers and counters of the MAC procedures (BSR, PHR . . . ) have already been affected by the previous (failed) transmission.

MAC CE's may be recovered and stored or the events that triggered these MAC Ce's may be restored so when multiplexing and assembly of the MAC PDU is reperformed, triggering is reevaluated and reported values recalculated.

The more complex case is what to do when the grant is smaller. First determine what may be sent from the previous PDU according to LCP. Then recover MAC SDUs that may not be transmitted and reset MAC procedure timers and coulters associated with a MAC CE transmission so that the timers and counters may be set to values before the MAC CE was built.

New higher priority data or other MAC CE triggering events may have been received since the previous transmission. To handle this possibility the multiplexing an assembly procedure may not prioritize MAC SDUs associated with the failed MAC PDU transmission.

There may be similar problems with the MAC CE's, they are now old and backing out the MAC procedures is complex.

The NB should be informed MAC CEs transmission have been delayed or when transmission was originally scheduled.

Another problem is segmentation is performed in the RLC and there is a possibility the MAC SDU is too large. Having the MAC request RLC backs out the previous RLC PDU is enormously complex. One way to address this is to fake an RLC negative acknowledgement for the RLC PDU's that correspond to this MAC SDU and other SDU's that may not be multiplexed into the new MAC PDU transmission.

Beam Failure Detection and Recovery

The following modifications to the Beam Failure and Detection procedure to take into account the effect of LBT in NR-U: If the Beam Failure Recovery Timer expires but LBT Failures have been detected since the initiation of Random Access procedure for beam failure recovery, the Beam Failure Recovery Timer should be extended. This may be necessary to avoid premature expiration of Beam Failure Recovery Timer and potentially cell reselection or RRC (re) establishment.

It is understood that the entities performing the steps illustrated herein, such as FIG. 2-FIG. 10, may be performed by logical entities. The steps may be stored in a memory of, and executing on a processor of, a device, server, or computer system such as those illustrated in FIG. 12A-FIG. 12G. Skipping steps, combining steps, or adding steps between exemplary methods disclosed herein is contemplated.

Table 1 provides exemplary abbreviations or definitions.

TABLE 1

Abbreviations and Definitions

| Abbreviations | Definitions |
| --- | --- |
| 3GPP | 3rd Generation Partnership Project (3GPP) |
| BSR | Buffer Status Report |
| BWP | Bandwidth Part |
| CE | Control Element |
| CG | Cell Group |
| C-RNTI | Cell RNTI |
| CS-RNTI | Configured Scheduling RNTI |
| DL | Downlink |
| DRX | Discontinuous Reception |
| eNB | Evolved Node B |
| gNB | g NB, A RAN node which supports the NR as well as connectivity to NGC |
| HARQ | Hybrid Automatic Repeat Request |
| LBT | Listen Before Talk |
| LCP | Logical Channel Prioritization |
| MAC | Medium Access Control |
| MSG3 | Message 3 |
| NB | Node B |
| NGC | Next Generation Core network |
| NR | New Radio |
| NR-U | NR Unlicensed |
| PDCCH | Physical Downlink Control Channel |
| PDU | Protocol Data Unit |
| PHR | Power Headroom Reporting |
| PHY | Physical Layer |
| P-MPR | Power Management Maximum Power Reduction |
| PRACH | Physical Random Access Channel |
| PSCell | Primary Secondary Cell |
| PUCCH | Physical Uplink Control Channel |
| QoS | Quality of Service |
| RLC | Radio Link Control |
| RRC | Radio Resource Control |
| RA | Random Access |
| RAN | Radio Access Network |
| RA-RNTI | Random Access RNTI |
| RNTI | Radio Network Temporary Identifier |
| SCell | Secondary Cell |
| SDU | Service Data Unit |
| SpCell | Special Cell |
| SR | Scheduling Request |
| UE | User Equipment |
| UL | Uplink |
| UL-SCH | Uplink Shared Channel |
| 3GPP | 3rd Generation Partnership Project (3GPP) |
| BSR | Buffer Status Report |
| BWP | Bandwidth Part |
| CE | Control Element |
| CG | Cell Group |
| C-RNTI | Cell RNTI |
| CS-RNTI | Configured Scheduling RNTI |

TABLE 1-continued

Abbreviations and Definitions

| Abbreviations | Definitions |
|---|---|
| DL | Downlink |
| DRX | Discontinuous Reception |
| eNB | Evolved Node B |
| gNB | g NB, A RAN node which supports the NR as well as connectivity to NGC |
| HARQ | Hybrid Automatic Repeat Request |
| LBT | Listen Before Talk |
| LCP | Logical Channel Prioritization |
| MAC | Medium Access Control |
| MSG3 | Message 3 |
| NB | Node B |
| NGC | Next Generation Core network |
| NR | New Radio |
| NR-U | NR Unlicensed |
| PDCCH | Physical Downlink Control Channel |
| PDU | Protocol Data Unit |
| PHR | Power Headroom Reporting |
| PHY | Physical Layer |
| P-MPR | Power Management Maximum Power Reduction |
| PRACH | Physical Random Access Channel |
| PSCell | Primary Secondary Cell |
| PUCCH | Physical Uplink Control Channel |
| QoS | Quality of Service |

Figure 11:
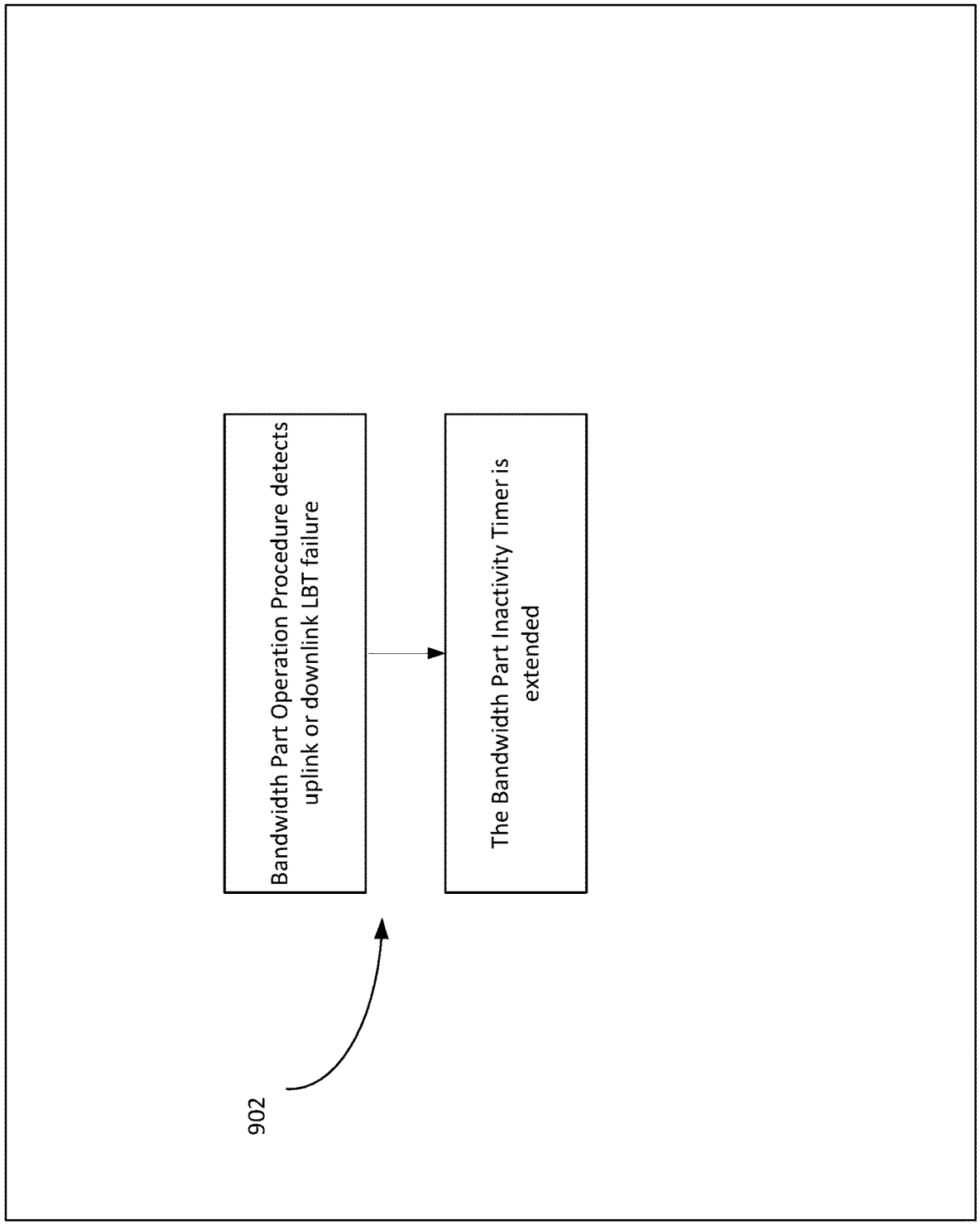
FIG. 11 illustrates an exemplary display (e.g., graphical user interface) that may be generated based on the methods, systems, and devices of NR-U LBT MAC procedures.

FIG. 11 illustrates an exemplary display (e.g., graphical user interface) that may be generated based on the methods, systems, and devices of NR-U LBT MAC procedures, as discussed herein. Display interface 901 (e.g., touch screen display) may provide text in block 902 associated with NR-U LBT MAC procedures, such as PHR related parameters and method flow, among other things. Progress of any of the steps (e.g., sent messages or success of steps) discussed herein may be displayed in block 902. In addition, graphical output 902 may be displayed on display interface 901. Graphical output may be the topology of the devices implementing the methods, systems, and devices of NR-U LBT MAC procedures, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 12A:
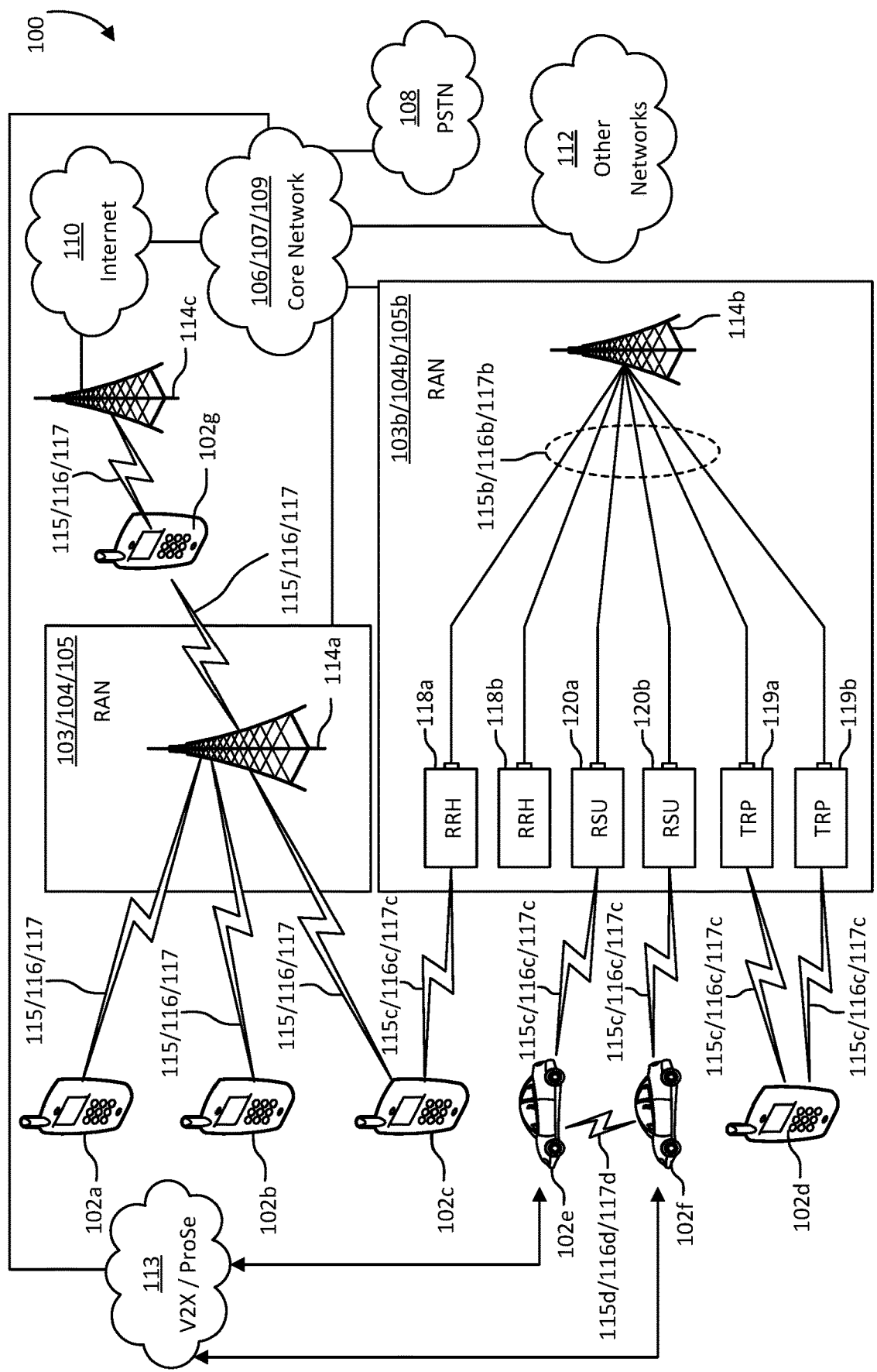
FIG. 12A illustrates an example communications system.

FIG. 12A illustrates an example communications system 100 in which the methods and apparatuses of NR-U LBT MAC procedures, such as the systems and methods illustrated in FIG. 1 through FIG. 10 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 12A, FIG. 12B, FIG. 12C, FIG. 12D, FIG. 12E, or FIG. 12F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 12A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations or network elements (not shown), such as a BSC, a RNC, relay nodes, etc. The base station 114*a* may be configured to transmit or receive wireless signals within a particular geographic region, which may be referred to as a cell (not shown). Similarly, the base station 114*b* may be configured to transmit or receive wired or wireless signals within a particular geographic region, which may be referred to as a cell (not shown) for methods, systems, and devices of NR-U LBT MAC procedures, as disclosed herein. Similarly, the base station 114*b* may be configured to transmit or receive wired or wireless signals within a particular geographic region, which may be referred to as a cell (not shown). The cell may further be divided into cell sectors. For example, the cell associated with the base station 114*a* may be divided into three sectors. Thus, in an example, the base station 114*a* may include three transceivers, e.g., one for each sector of the cell. In an example, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c*, or 102*g* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, or RSUs 120*a*, 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, or 102*f* may communicate with one another over an air interface 115*d*/116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPs 119*a*, 119*b* or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 12A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of NR-U LBT MAC procedures, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 12A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 12A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of NR-U LBT MAC procedures, as disclosed herein. For example, the WTRU 102g shown in FIG. 12A may be configured to communicate with the base station 114a, which may employ a cellular-based radio technology, and with the base station 114c, which may employ an IEEE 802 radio technology.

Although not shown in FIG. 12A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 12B:
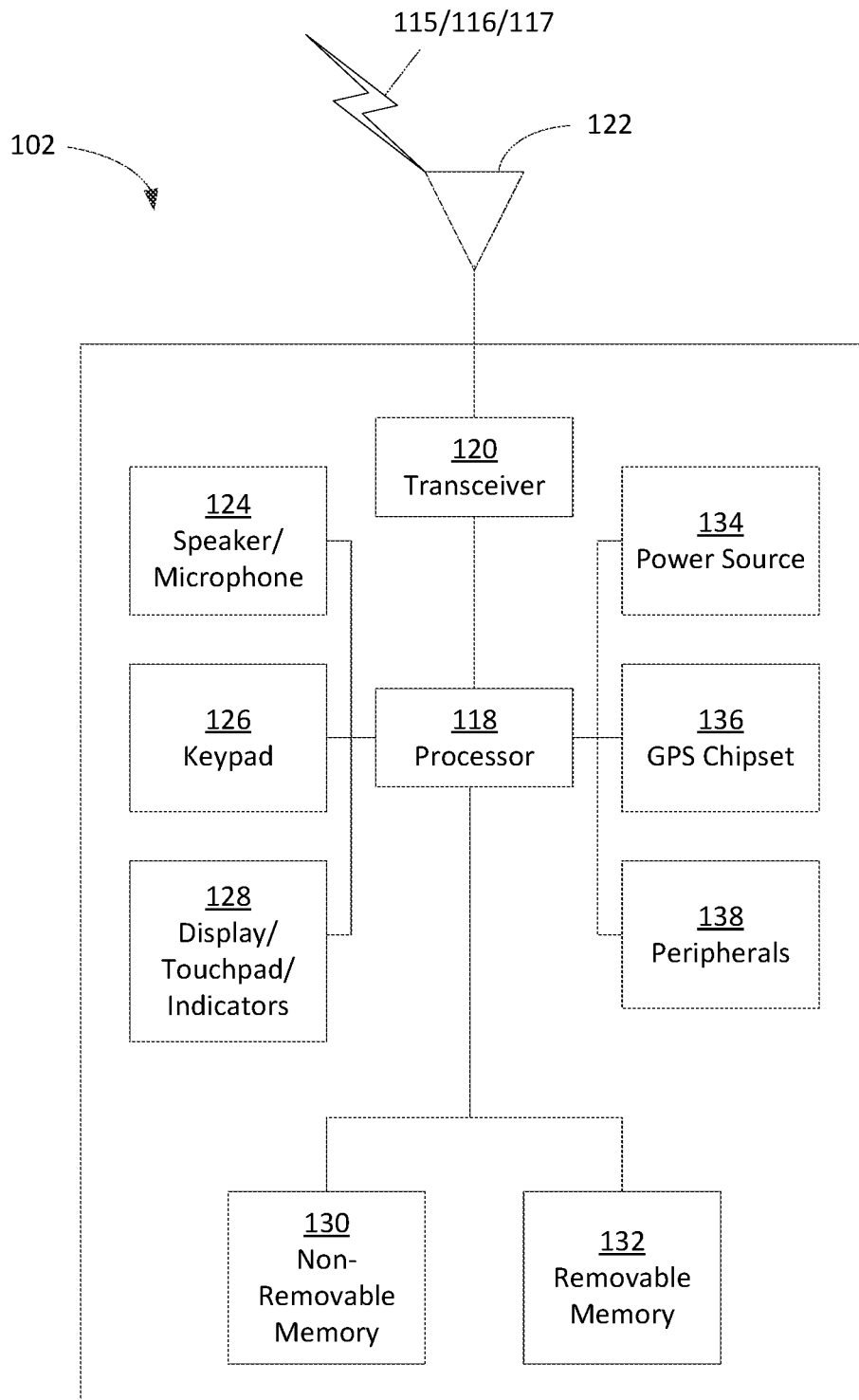
FIG. 12B illustrates an exemplary system that includes RANs and core networks.

FIG. 12B is a system diagram of an example RAN 103 and core network 106 that may implement methods, systems, and devices of NR-U LBT MAC procedures, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 12B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 12B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 12B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 12C:
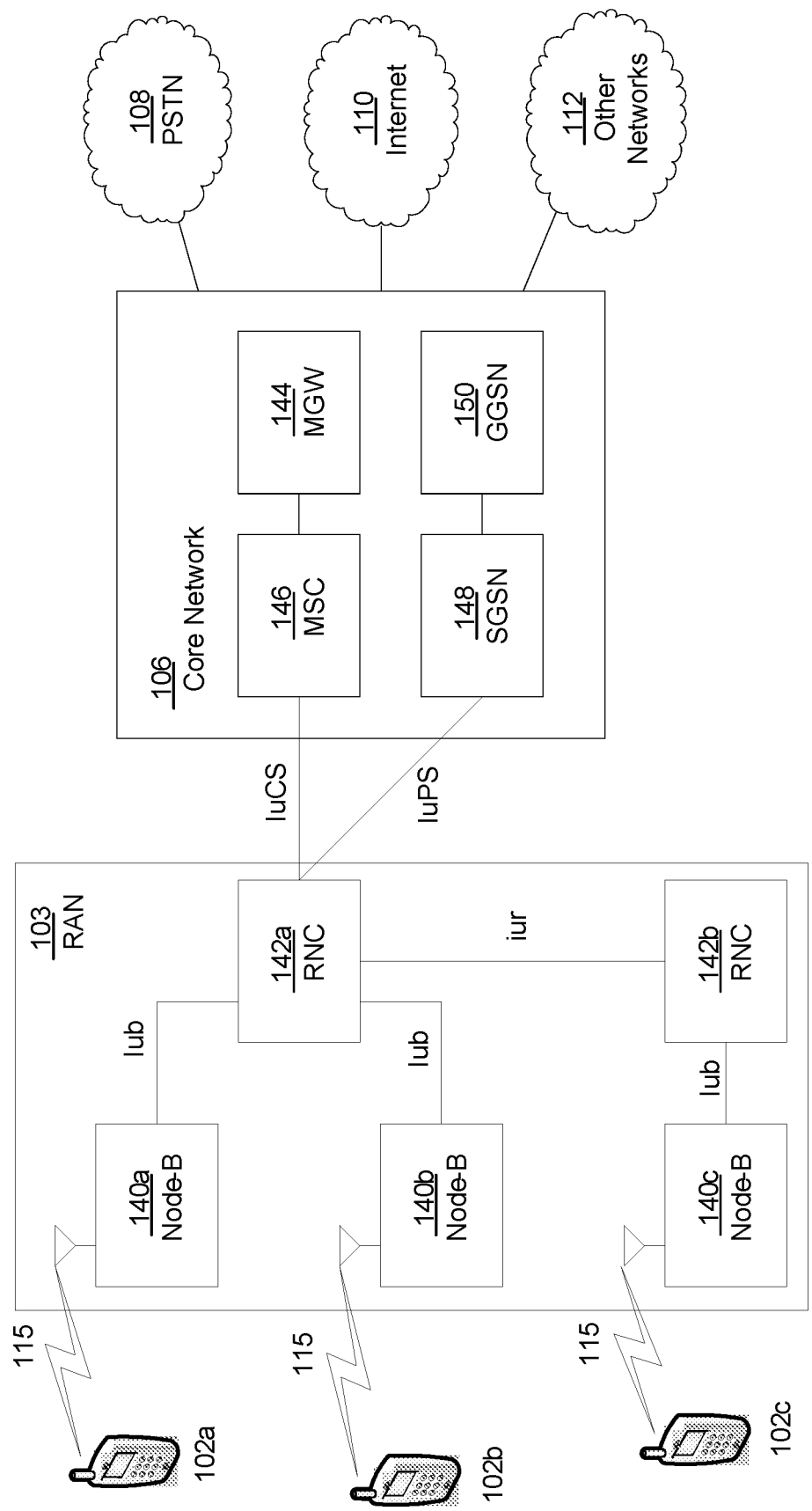
FIG. 12C illustrates an exemplary system that includes RANs and core networks.

FIG. 12C is a system diagram of an example RAN 104 and core network 107 that may implement methods, systems, and devices of NR-U LBT MAC procedures, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 12C, the eNode-Bs 160a, 160b, and 160c may communicate with one another over an X2 interface.

The core network 107 shown in FIG. 12C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 12D:
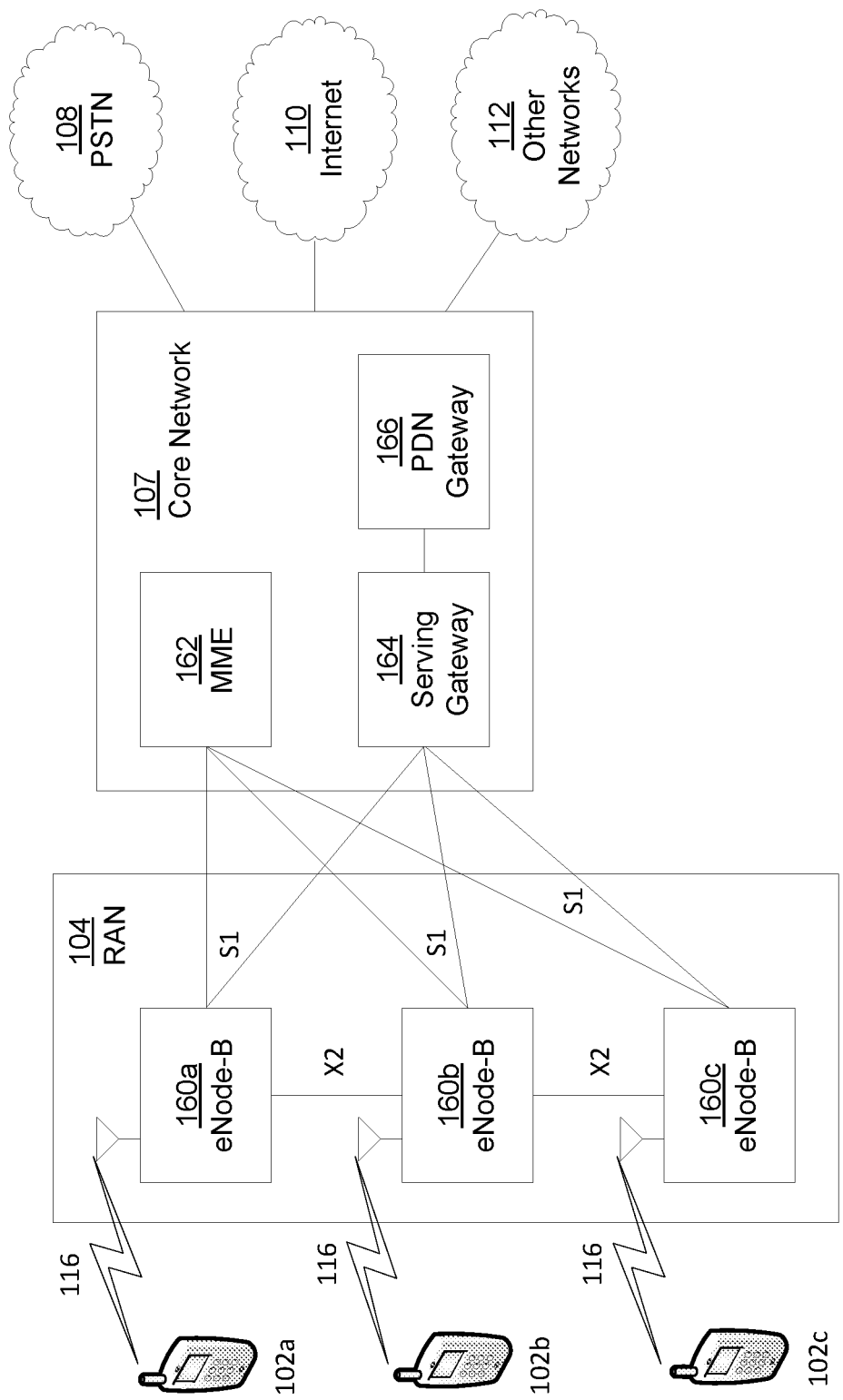
FIG. 12E illustrates another example communications system.
FIG. 12F is a block diagram of an example apparatus or device, such as a WTRU.
FIG. 12G is a block diagram of an exemplary computing system.

FIG. 12D is a system diagram of an example RAN 105 and core network 109 that may implement methods, systems, and devices of NR-U LBT MAC procedures, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 12D, the gNode-Bs 180a and 180b may communicate with one another over an Xn interface, for example.

The core network 109 shown in FIG. 12D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 12G.

In the example of FIG. 12D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 12D shows that network functions directly connect to one another, however, it should be appreciated that they may communicate via routing agents such as a diameter routing agent or message buses.

In the example of FIG. 12D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 12D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 12D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 12D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 12A, FIG. 12C, FIG. 12D, or FIG. 12E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 12A, FIG. 12B, FIG. 12C, FIG. 12D, or FIG. 12E are provided by way of example only, and it is understood that the subject matter disclosed and claimed herein may be embodied or implemented in any similar communication system, whether presently defined or defined in the future.

Figure 12E:
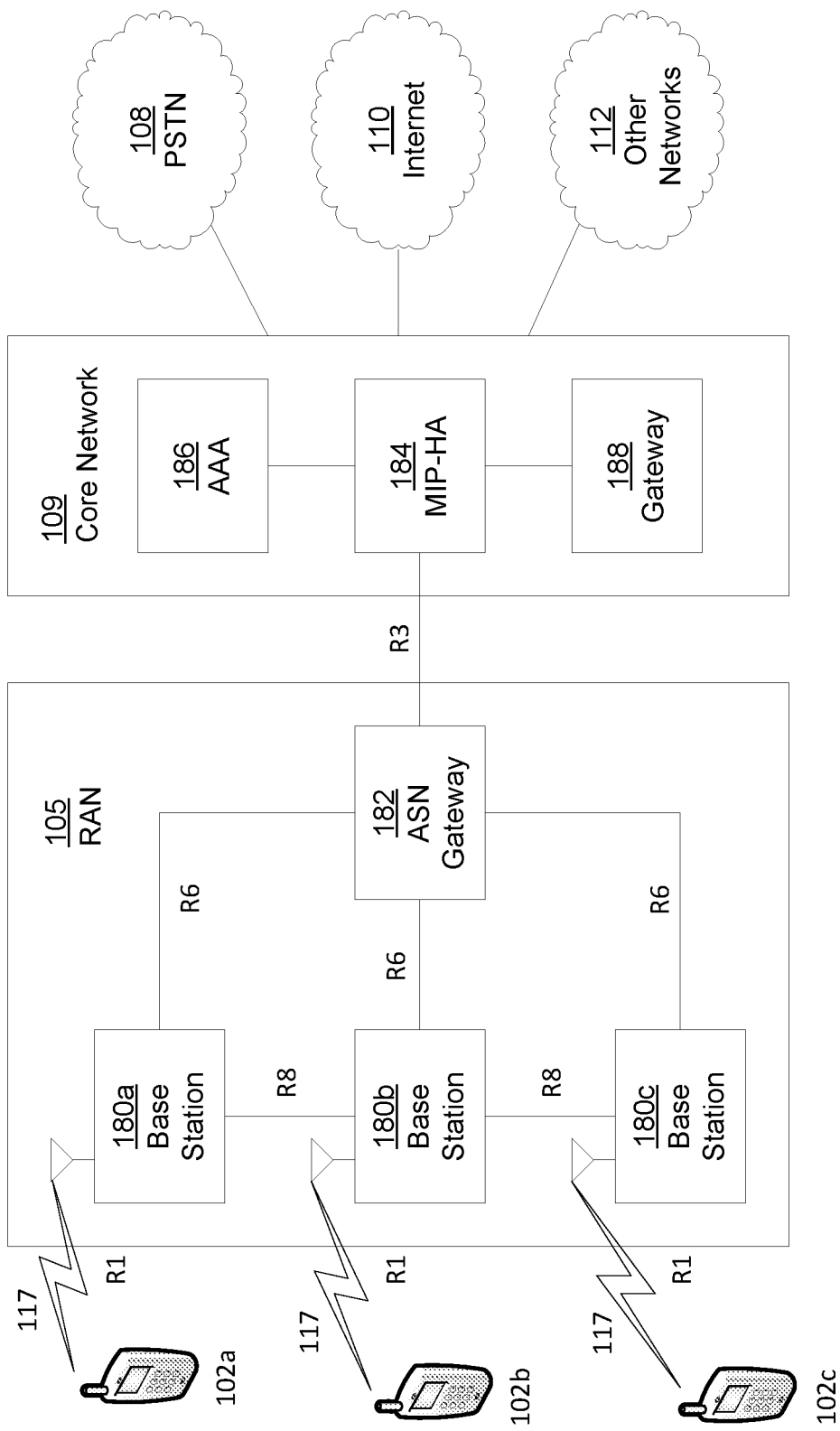

FIG. 12E illustrates an example communications system 111 in which the systems, methods, apparatuses that implement NR-U LBT MAC procedures, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 12E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 12E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 12F:
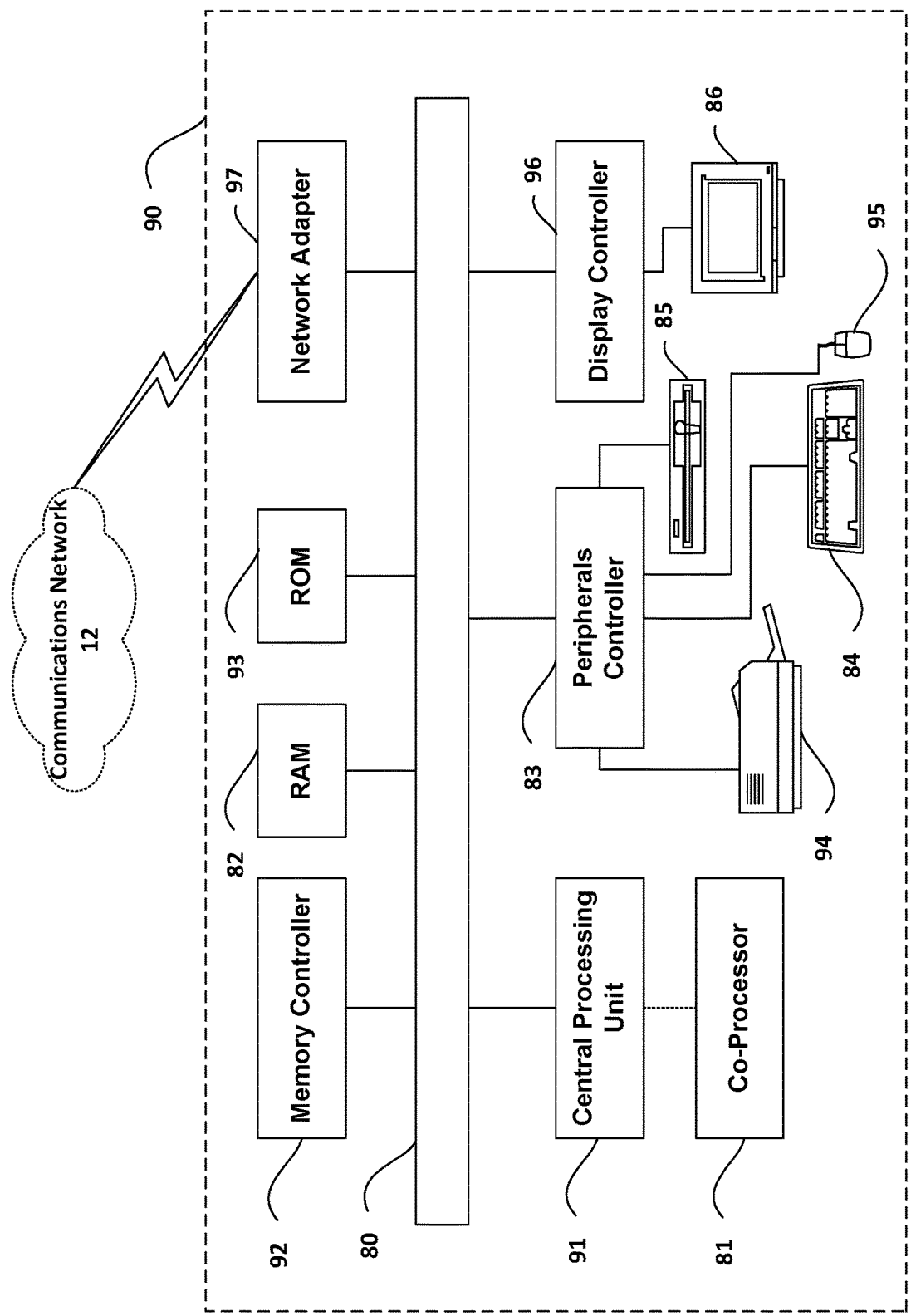

FIG. 12F is a block diagram of an example apparatus or device WTRU 102 that may be configured for wireless communications and operations in accordance with the systems, methods, and apparatuses that implement NR-U LBT MAC procedures, described herein, such as a WTRU 102 of FIG. 12A, FIG. 12B, FIG. 12C, FIG. 12D, or FIG. 12E, or FIG. 1 (e.g., UE 101). As shown in FIG. 12F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 12F and may be an exemplary implementation that performs the disclosed systems and methods for NR-U LBT MAC procedures described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 12F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 12A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 12F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the LBT FC in some of the examples described herein are successful or unsuccessful, or otherwise indicate a status of NR-U LBT MAC procedures and associated components. The control lighting patterns, images, or colors on the display or indicators 128 may be reflective of the status of any of the method flows or components in the FIG.'s illustrated or discussed herein (e.g., FIG. 1-FIG. 10, etc). Disclosed herein are messages and procedures of NR-U LBT MAC procedures. The messages and procedures may be extended to provide interface/API for users to request resources via an input source (e.g., speaker/microphone 124, keypad 126, or display/touchpad/indicators 128) and request, configure, or query NR-U LBT MAC procedures related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 12G:
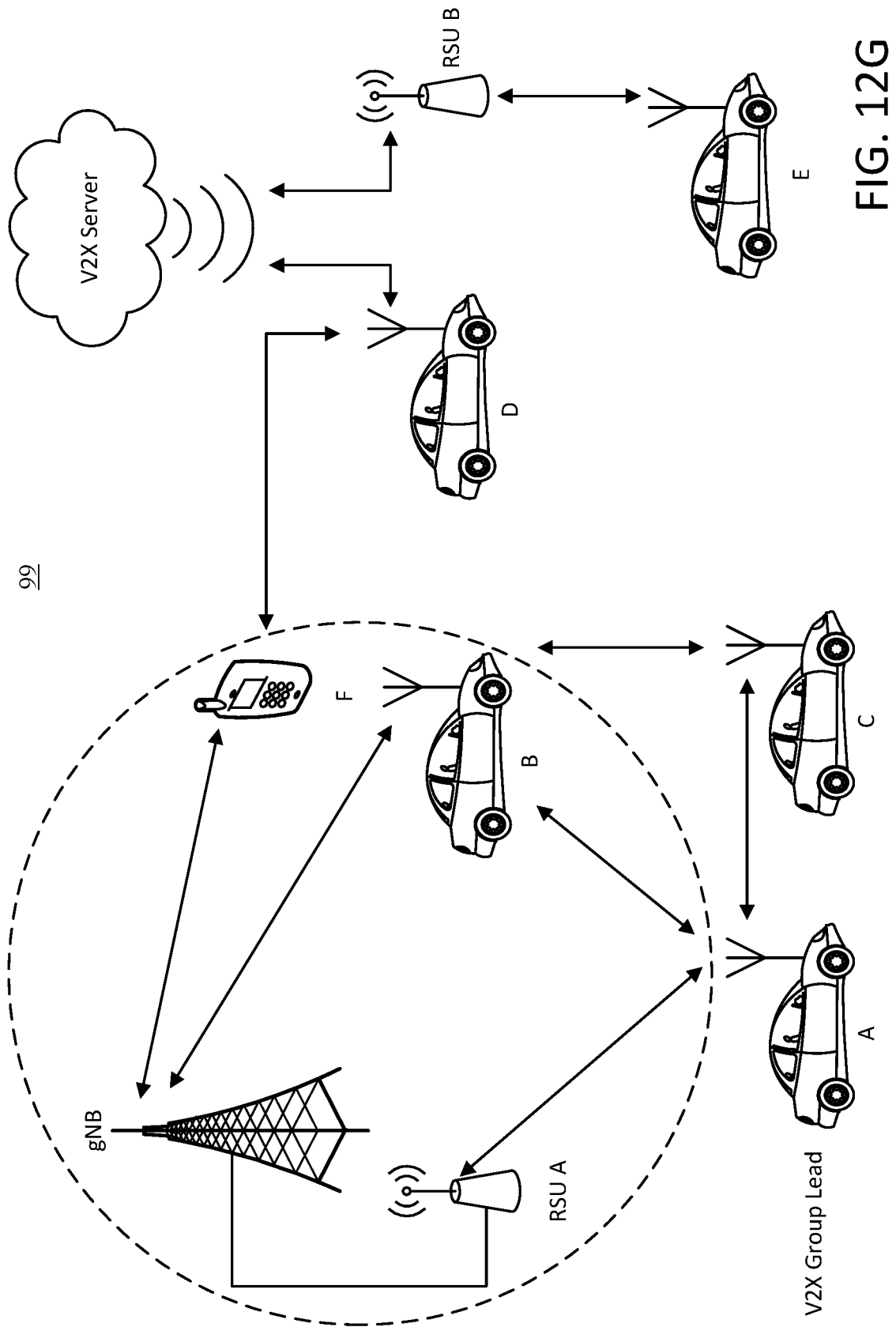

FIG. 12G is a block diagram of an exemplary computing system 90 in which one or more apparatuses of the communications networks illustrated in FIG. 12A, FIG. 12C, FIG. 12D and FIG. 12E as well as NR-U LBT MAC procedures, such as the systems and methods illustrated in FIG. 1 through FIG. 10 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for NR-U LBT MAC procedures, such as receiving or reacting to LBT failures.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 12A, FIG. 12B, FIG. 12C, FIG. 12D, or FIG. 12E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—NR-U LBT MAC procedures—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

This written description uses examples to disclose the subject matter, including the best mode, and also to enable any person skilled in the art to practice the subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein, such as FIG. 2-FIG. 10, among others). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means NR-U LBT MAC procedures. SR procedure LBT failure may result in 1) Switch to alternate BWP, 2) Initiation of RA procedure, or 3) SR Pending state maintained. DRX procedure LBT failure may result in 1) On Duration or Inactivity timers extended, 2) On Duration or Inactivity timers aligned to MCOT, CWS, or CCA, or 3) Short Cycle applied. RA procedure LBT failure may result in 1) generating or sending a statistical report, or 2) setting prohibit timer. BWP procedure LBT failure may result in 1) extending BWP inactivity timer or 2) switching to alternate BWP. All combinations (including the removal or addition of steps) in this and the following paragraph (or associated paragraphs herein) are contemplated.

Methods, systems, and apparatuses, among other things, as described herein may provide for means NR-U LBT MAC procedures. A method, system, computer readable storage medium, or apparatus has means for LBT failure with regard to the Random Access Procedure, SCell Activation/Deactivation Procedure, Discontinuous Reception Procedure, Scheduling Request Procedure, Buffer Status Reporting Procedure, Logical Channel Prioritization Procedure, Coordination of UE and NB MAC Procedures, Power Headroom Reporting Procedure, or Bandwidth Part Operation Procedure, among other things. A method, system, computer readable storage medium, or apparatus has means for determining that preamble transmission counter is greater than one, the notification of a suspending power ramping counter has not been received from lower layers, SSB selected is not changed, and LBT Failure has not been detected; and based on the determining step, providing instructions to increment preamble power ramping counter by 1. A method, system, computer readable storage medium, or apparatus has means for operations associated with listen before talk (LBT) and medium access control (MAC) that may include obtaining (e.g., receiving from a remote device or detecting using local sensor) indications of LBT states associated with a user equipment (UE); and generating an LBT report MAC control element (LBTR MAC CE), wherein the LBTR MAC CE may include the indications of LBT states. A method, system, computer readable storage medium, or apparatus has means for providing LBT timing information to a MAC layer. The LBT timing information may include a period of clear channel assessment, a maximum channel occupancy time, or a contention window. A method, system, computer readable storage medium, or apparatus has means for operations associated with listen before talk (LBT) and discontinuous reception (DRX) that may include detecting a first threshold of LBT failure or a second threshold of LBT Success associated with a user equipment (UE); and based on detecting the first threshold or the second threshold, adjusting a DRX configuration. The DRX configuration may include On Duration or an inactivity timer. A method, system, computer readable storage medium, or apparatus has means for a base station providing information to a UE, wherein the information may include downlink information regarding an access channel associated with the base station or UE. The UE may automatically detect information about uplink information. Based on the uplink or downlink information, the UE may effect different MAC procedures. In an example, UE may use the uplink and downlink information determine whether to report LBT failures or report which procedures are affected. A method, system, computer readable storage medium, or apparatus has means for obtaining downlink information that was detected by a base station, wherein the downlink information is associated with channel access of the base station and may include an indication of downlink listen-before-talk failure; obtaining uplink information, wherein the uplink information is detected by the apparatus, wherein the uplink information is associated with channel access of the apparatus and may include an indication of uplink listen-before-talk failure; and based on the indication of uplink listen-before-talk failure or the indication of downlink listen-before-talk failure, executing medium access control operations. The uplink listen-before-talk failure (or success) or the downlink listen-before-talk failure (or success) may be detected by a scheduling request procedure, a buffer status reporting procedure, a logical channel prioritization procedure, a discontinuous reception procedure, a SCell activation or deactivation procedure, a power headroom reporting procedure, a random access procedure, listen-before-talk report procedure, or bandwidth part operations procedure. All combinations (including the removal or addition of steps) in this and the following paragraph (or associated paragraphs herein) are contemplated.

A method, system, computer readable storage medium, or apparatus has means for managing MAC procedures. A method, system, computer readable storage medium, or apparatus has means for obtaining downlink information, wherein the downlink information is associated with channel access of the base station (to the apparatus); obtaining uplink information (e.g., user equipment), wherein the uplink information is associated with channel access by the apparatus (e.g., to the base station); and based on the uplink information or downlink information, executing medium access control operations. The downlink information may be detected by a base station. The uplink information may be detected by the apparatus. Channel access information may be information related to listen-before-talk operation. The executing of medium access control operations may include extending a bandwidth part inactivity timer, wherein the uplink or downlink information comprises uplink or downlink listen-before-talk failure information. There may be switching BWP upon UL or DL LBT failure information (independent of the BWP operation MAC procedure and the switching may be to a preconfigured alternate BWP). The executing of medium access control operations may include extending a random access response window, wherein the uplink or downlink information comprises uplink or downlink listen-before-talk failure information. The executing of medium access control operations may include not incrementing a preamble transmission counter or extending a contention resolution timer, wherein the uplink or downlink information comprises uplink or downlink listen-before-talk failure information. The executing of medium access control operations may include maintaining or decreasing a power ramping, wherein the uplink or downlink information comprises uplink or downlink listen-before-talk failure information. Disclosed subject matter may avoid stalling of the RA procedure due to LBT failures. Further, a preamble transmission LBT failure threshold when exceeded may result in indication of RA problem to higher layers and considering the RA procedure unsuccessful. The executing of medium access control operations may include determining that a physical uplink control channel resource is valid based on determining whether or not there is a listen-before-talk failure or success, in which this may be associated with the SR procedure reaching an LBT failure threshold and releasing PUCCH resources. CCA, MCOT, or CWS information may be provided with LBT success information. Also LBT success with this CCA, MCOT, or CWS information may be equivalent to an LBT failure indication since knowledge of success may imply there was no failure. When LBT is referred it could be determined by an LBT success indication. With regard to DRX, it may cover upon LBT failure applying the short cycle or extending Active Time. In addition, when restarting the In Activity timer there may be a limiting of how many times LBT failure extend Active Time. Further upon LBT failure adjusting the DRX configuration. This may be associated with On Duration, In Activity, or DRX Cycle timers. For LBTR, upon LBT failure or success, a report to the base station may be triggered when LBT success or failures exceed a threshold over a known period of time; after the report is sent a prohibit timer may be set to limit the frequency of reports; and the report may include timing info such as CCA, MCOT, or CWS. SR failure due to LBT reaching a known threshold may result in RA procedure being initiated (e.g., achieved by limiting the amount of times the SR transmission counter is not incremented due to LBT failure), SR prohibit timer is not set upon LBT failure, or SR Pending is maintained upon LBT failure. The executing of medium access control operations may include: based on a scheduling request transmission listen-before-talk failure indication, determining scheduling request failure or initiating a random access procedure. The executing of medium access control operations may include: based on a scheduling request transmission listen-before-talk failure indication, determining scheduling request failure or switching bandwidth part. The executing of medium access control operations may include: extending apparatus MAC procedure timers or counters, affecting operation when MAC procedures are effected by uplink or downlink channel access to allow for similar performance as licensed operation, or apparatus reporting channel access information to a base station. All combinations (including the removal or addition of steps) in this and the following paragraph (or associated paragraphs herein) are contemplated.

A method, system, computer readable storage medium, or apparatus has means for managing MAC procedures. A method, system, computer readable storage medium, or apparatus has means for obtaining downlink information from a base station, wherein the downlink information is associated with channel access of the apparatus; obtaining uplink information, wherein the uplink information is detected by the apparatus; and based on the uplink information or downlink information, executing medium access control operations. The executing of medium access control operations may include extending a bandwidth part inactivity timer, wherein the uplink or downlink information may include uplink or downlink listen-before-talk failure information. The executing of medium access control operations may include extending a random access response window, wherein the uplink or downlink information may include uplink or downlink listen-before-talk failure information. The executing of medium access control operations may include incrementing a preamble transmission counter or extending a contention resolution timer, wherein the uplink or downlink information may include uplink or downlink listen-before-talk failure information. The executing of medium access control operations may include maintaining or decreasing (e.g., not increasing) a power ramping, wherein the uplink or downlink information may include uplink or downlink listen-before-talk failure information. The executing of medium access control operations may include determining that a physical uplink control channel (PUCCH) resource is valid based on determining whether or not there is a listen-before-talk failure or listen-before-talk failure success (e.g., triggered by a threshold success or failure). The executing of medium access control operations may include adjusting discontinuous reception operation, wherein the uplink or downlink information may include clear channel assessment period, maximum channel occupancy time, or a downlink listen-before-talk success indication signaled from the base station at a discontinuous reception cycle. The executing of medium access control operations may include: adjusting, in a discontinuous reception operation, active time to align with a maximum channel occupancy time period; and applying discontinuous reception during a contention window size period or clear channel assessment period. The align with the maximum channel occupancy time period may include adjusting an OnDuration timer; or adjusting an inactivity timer. The executing of medium access control operations may include reporting the medium access control operations that are affected by the uplink or downlink information. The executing of medium access control operations may include reporting the medium access control operations that are affected by the uplink or downlink information, wherein the uplink or downlink information may include uplink or downlink listen-before-talk failure information. The executing of medium access control operations may include reporting how one or more of the medium access control operations are affected by the uplink or downlink information. The executing of medium access control operations may include reporting how one or more of the medium access control operations are affected by the uplink or downlink information, wherein the uplink or downlink information may include uplink or downlink listen-before-talk failure information. Generally, the uplink or downlink information, such as LBT failures or success, among other things, may trigger MAC operations as disclosed herein. The apparatus may be a user equipment. All combinations (including the removal or addition of steps) in this paragraph (or associated paragraphs herein) are contemplated.

What is claimed is:

1. An apparatus comprising:
a processor; and
memory coupled with the processor, the memory storing executable instructions that when executed by the processor cause the processor to effectuate operations comprising:
determining that one or more listen-before-talk (LBT) failures have occurred;
attempting to transmit
a random access preamble based on determining that the one or more LBT failures have occurred;
determining that there was a LBT failure for the random access preamble transmission;
determining not to increment a preamble transmission counter and not to increment a preamble power ramping counter based on determining that there was an LBT failure for the random access preamble transmission;
determining that a LBT failure counter has reached a configured number of failure indications within a sliding time window;
based on determining that the LBT failure counter has reached the configured number of failure indications within the sliding time window, switching from a first bandwidth part (BWP) to a second BWP; and
transmitting a LBT report medium access control (MAC) control element (CE) to a base station, wherein the LBT report MAC CE indicates LBT failure information detected by the apparatus.

2. The apparatus of claim 1, wherein the sliding time window corresponds to a period of time that is extended based on detecting an LBT failure.

3. The apparatus of claim 1, wherein the LBT report MAC CE is transmitted to the base station using available uplink shared channel (UL-SCH) resources.

4. The apparatus of claim 1, wherein the operations further comprise resetting the LBT failure counter to zero.

5. The apparatus of claim 1, wherein the failure indications that occurred within the sliding time window are associated with at least one uplink failure and at least one downlink failure.

6. The apparatus of claim 1, wherein the operations further comprise cancelling a triggered consistent LBT failure.

7. The apparatus of claim 1, wherein determining that one or more LBT failures have occurred is based on a physical layer indication.

8. The apparatus of claim 1, wherein determining that there was a failure for the random access preamble transmission is based on a physical layer indication.

9. A method comprising:
   determining that one or more listen-before-talk (LBT) failures have occurred;
   attempting to transmit
   a random access preamble based on determining that the one or more LBT failures have occurred;
   determining that there was a LBT failure for the random access preamble transmission;
   determining not to increment a preamble transmission counter and not to increment a preamble power ramping counter based on determining that there was an LBT failure for the random access preamble transmission;
   determining that a LBT failure counter has reached a configured number of failure indications within a sliding time window;
   based on determining that the LBT failure counter has reached the configured number of failure indications within the sliding time window, switching from a first bandwidth part (BWP) to a second BWP; and
   transmitting a LBT report medium access control (MAC) control element (CE) to a base station, wherein the LBT report MAC CE indicates LBT failure information detected by the apparatus.

10. The method of claim 9, wherein the sliding time window corresponds to a period of time that is extended based on detecting an LBT failure.

11. The method of claim 9, wherein the LBT report MAC CE is transmitted to the base station using available uplink shared channel (UL-SCH) resources.

12. The method of claim 9, further comprising resetting the LBT failure counter to zero.

13. The method of claim 9, wherein the failure indications that occurred within the sliding time window are associated with at least one uplink failure and at least one downlink failure.

14. The method of claim 9, further comprising cancelling a triggered consistent LBT failure.

15. The method of claim 9, wherein determining that one or more LBT failures have occurred is based on a physical layer indication.

16. The method of claim 9, wherein determining that there was a failure for the random access preamble transmission is based on a physical layer indication.

* * * * *